United States Patent
Chen et al.

(10) Patent No.: US 12,250,613 B2
(45) Date of Patent: Mar. 11, 2025

(54) METHOD AND DEVICE FOR WIRELESS COMMUNICATION CONCERNING NON-UNICAST SERVICE

(71) Applicants: Yu Chen, Shanghai (CN); Xiaobo Zhang, Shanghai (CN)

(72) Inventors: Yu Chen, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 110 days.

(21) Appl. No.: 17/575,657

(22) Filed: Jan. 14, 2022

(65) Prior Publication Data

US 2022/0232351 A1    Jul. 21, 2022

(30) Foreign Application Priority Data

Jan. 15, 2021  (CN) .......................... 202110053788.2

(51) Int. Cl.
| | | |
|---|---|---|
| *H04W 4/06* | (2009.01) | |
| *H04W 8/26* | (2009.01) | |
| *H04W 40/24* | (2009.01) | |

(52) U.S. Cl.
CPC .............. *H04W 4/06* (2013.01); *H04W 8/26* (2013.01); *H04W 40/24* (2013.01)

(58) Field of Classification Search
CPC ......... H04W 4/06; H04W 8/26; H04W 40/24; H04W 76/20; H04W 76/22; H04W 76/23; H04W 76/25; H04W 76/27; H04W 74/0833; H04W 72/23; H04W 72/231; H04W 72/232; H04W 48/10; H04W 48/12; H04L 5/0007; H04L 5/0048; H04L 5/0053
See application file for complete search history.

(56) References Cited

U.S. PATENT DOCUMENTS

| | | | | |
|---|---|---|---|---|
| 2010/0165909 A1* | 7/2010 | Yuhara | .................... | H04H 60/15 370/312 |
| 2018/0027527 A1* | 1/2018 | Vitthaladevuni | ........................... | H04W 72/0453 370/330 |
| 2020/0351129 A1* | 11/2020 | Kwak | .................... | H04W 72/53 |
| 2023/0023919 A1* | 1/2023 | Qi | ........................... | H04W 4/06 |

* cited by examiner

*Primary Examiner* — Peter Chen

(57) ABSTRACT

The present disclosure discloses a method and device for wireless communications, comprising receiving a first signaling, the first signaling being used to indicate a first ID set of a first service, the first service being a non-unicast service, and the first ID set comprising a plurality of IDs; determining a target ID; and applying the target ID to receive the target data set; wherein the first service comprises K data sets, the target data set is one of the K data sets, K being a positive integer greater than 1; the first ID set comprises K IDs, and the target ID is one of the K IDs in the first ID set. The application receives a target data set by receiving a first signaling and determining a target ID, which helps to improve efficiency and save power.

19 Claims, 6 Drawing Sheets

METHOD AND DEVICE FOR WIRELESS COMMUNICATION CONCERNING NON-UNICAST SERVICE

CROSS REFERENCE TO RELATED APPLICATIONS

This application claims the priority benefit of Chinese Patent Application 202110053788.2, filed on Jan. 15, 2021, the full disclosure of which is incorporated herein by reference.

BACKGROUND

Technical Field

The present disclosure relates to transmission methods and devices in wireless communication systems, and in particular to a header compression related method for improving efficiency and reducing redundancy in wireless communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR.

In communications, whether Long Term Evolution (LIE) or 5G NR involves features of accurate reception of reliable information, optimized energy efficiency ratio, determination of information efficiency, flexible resource allocation, scalable system structure, efficient non-access layer information processing, low service interruption and dropping rate and support for low power consumption, which are of great significance to the maintenance of normal communications between a base station and a UE, reasonable scheduling of resources and balancing of system payload. Those features can be called the cornerstone of high throughout and are characterized in meeting communication requirements of various services, improving spectrum utilization and improving service quality, which are indispensable in enhanced Mobile BroadBand (eMBB), Ultra Reliable Low Latency Communications (URLLC) and enhanced Machine Type Communications (eMTC). Meanwhile, in the following communication modes, covering Industrial Internet of Things (IIoT), Vehicular to X (V2X), Proximity Services (ProSe), Device to Device communications, Unlicensed Spectrum communications, User communication quality monitoring, network planning optimization, Non-Territorial Networks (NTN), Territorial Networks (TN), Dual connectivity system, systems utilizing sidelink and in the mixture of the above communication modes, there are extensive requirements in radio resource management and selection of multi-antenna codebooks as well as in signaling design, adjacent cell management, service management and beamforming. Transmission methods of information are divided into broadcast, multicast and unicast, which are all essential for 5G system for that they are very helpful to meet the above requirements. In order to increase the network coverage and improve the reliability of the system, information can also be forwarded through relay.

With the increase of scenarios and complexity of systems, higher requirements are raised for interruption rate and time delay reduction, reliability and system stability enhancement, service flexibility and power saving. At the same time, compatibility between different versions of different systems should be considered when designing the systems.

SUMMARY

In a variety of communication scenarios, transmission of broadcast groupcast/multicast services, i.e., non-unicast services, will be involved, which comprises a type of very important service application with diverse and variable contents. A UE joins in a broadcast groupcast service, but received data or contents are different based on different situations, including related to where the UE is located or other factors. If a cell is relatively large, such as an NTN cell, it may need to be subdivided into a plurality of relatively small areas in the covered area to correspond to different contents of a same service. How to let users receive the content they need is a problem, there are more than one receiving user since the service is transmitted in the form of broadcast and multicast, so it needs to be ensured that the reception of other users cannot be affected. It is easy to understand that a UE does not need to receive all content data at the same time only except the needed data, which is also relatively power-saving and very necessary, otherwise it is easy to confuse users by making chaos. In the existing system, different contents generally belong to different PDU sessions and/or different services, which is relatively easy to be distinguished. However, for a same service, it is very difficult for a same PDU session to support variable contents, and there must be other methods. Further, for a relatively small cell, as long as it is small enough, such as a common TN cell, it is also a feasible method for different cells to transmit different contents, and when a UE hands over to other cells, the received content also changes But for a relatively large cell, different contents of a same service are needed to be transmitted in parallel for multiple areas at the same time within its coverage. Since each small area may have users to receive, cell level distinguish is no longer feasible, and other methods are needed to distinguish contents of services to help UE receive correct content and ensure power saving and other characteristics at the same time. The present disclosure solves the above problems by determining a target ID to determine a data set needed to be received.

To address the above problem, the present disclosure provides a solution.

It should be noted that if no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

The present disclosure provides a method in a first node for wireless communications, comprising:
  receiving a first signaling, the first signaling being used to indicate a first identity (ID) set of a first service, the first service being a non-unicast service, and the first ID set comprising a plurality of IDs; determining a target ID; applying the target ID to receive the target data set;
  herein, the first service comprises K data sets, the target data set is one of the K data sets, K being a positive integer greater than 1; the first ID set comprises K IDs, and the target ID is one of the K IDs in the first ID set; the K data sets of the first service are respectively identified by the K IDs in the first ID set; any ID in the first ID set is one of a search space ID, a group common RNTI, a logical channel ID and a radio bearer ID; and a location of the first node is used to determine the target ID.

In one embodiment, a problem to be solved in the present disclosure includes: when a relatively large cell transmits a plurality of data sets of a non-unicast service in parallel, how to use a UE's location to determine which data set to receive. These data sets all belong to a same service and a same Protocol Data Unit (PDU) session. Otherwise, a UE should only monitor/detect/receive contents it needs, which is a most power-saving way with lowest complexity. In addition, for a UE, when handing over between different contents, it is better to be relatively seamless without user's participation.

In one embodiment, advantages of the above method include: first, a UE can only monitor/detect/receive the content of a service required by itself within a relatively large cell, where the service is a non-unicast service, and the service applies to different contents in different geographical areas.

Specifically, according to one aspect of the present disclosure, a first message is transmitted, the first message is used to indicate at least one of location information of the first node or a first area ID; and location information of the first node is used to determine the first area ID;

a second signaling is received, the second signaling indicates the target ID.

Specifically, according to one aspect of the present disclosure, the first signaling indicates a first area set, the first area set comprises K areas, and the K areas in the first area set are respectively associated with the K IDs in the first ID set; and the first area set and a location of the first node are used together to determine the target ID.

Specifically, according to one aspect of the present disclosure, each ID in the first ID set is a group common RNTI; the first signaling indicates a second ID set, and the second ID set comprises K IDs; the K IDs in the second ID set respectively correspond to the K IDs in the first ID set; any ID in the second ID set is one of a logical channel ID and a radio bearer ID; the K data sets of the first service are transmitted at the same time by respectively applying the K IDs in the first ID set and the K IDs in the second ID set.

Specifically, according to one aspect of the present disclosure, the first signaling indicates K flows of the first service, the K flows of the first service respectively correspond to the K data sets, and the K flows of the first service are mapped onto a same radio bearer.

Specifically, according to one aspect of the present disclosure, first information is received, and the first information is used to indicate K1 search space(s); each ID in the first ID set is a group common RNTI; each of the K IDs in the first ID set is associated with one of the K1 search space(s), wherein K1 is a positive integer not greater than K.

Specifically, according to one aspect of the present disclosure, before determining the target ID, a second target ID is applied to receive a second target data set; in response to determining the target ID, an RLC entity used to receive the second target data set is reset or released; the second target data set belongs to the first service; the second target ID belongs to the first ID set; and the second target ID is different from the target ID.

Specifically, according to one aspect of the present disclosure, the first node is a UE.

Specifically, according to one aspect of the present disclosure, the first node is an IoT terminal.

Specifically, according to one aspect of the present disclosure, the first node is a relay.

Specifically, according to one aspect of the present disclosure, the first node is a vehicle terminal.

Specifically, according to one aspect of the present disclosure, the first node is an aircraft.

The present disclosure provides a method in a second node for wireless communications, comprising:

transmitting a first signaling, the first signaling being used to indicate a first ID set of a first service, the first service being a non-unicast service, and the first ID set comprising a plurality of IDs; a receiver of the first signaling determining a target ID and applying the target ID to receive the target data set;

herein, the first service comprises K data sets, the target data set is one of the K data sets, K being a positive integer greater than 1; the first ID set comprises K IDs, and the target ID is one of the K IDs in the first ID set; the K data sets of the first service are respectively identified by the K IDs in the first ID set; any ID in the first ID set is one of a search space ID, a group common RNTI, a logical channel ID and a radio bearer ID; and a location of the receiver of the first signaling is used to determine the target ID.

Specifically, according to one aspect of the present disclosure, a first message is received, the first message is used to indicate at least one of location information of the first node or a first area ID; and location information of a transmitter of the first message is used to determine the first area ID;

a second signaling is transmitted, the second signaling indicates the target ID.

Specifically, according to one aspect of the present disclosure, the first signaling indicates a first area set, the first area set comprises K areas, and the K areas in the first area set are respectively associated with the K IDs in the first ID set; the first area set and a location of a receiver of the first signaling are used together to determine the target ID.

Specifically, according to one aspect of the present disclosure, each ID in the first ID set is a group common RNTI; the first signaling indicates a second ID set, and the second ID set comprises K IDs; the K IDs in the second ID set respectively correspond to the K IDs in the first ID set; any ID in the second ID set is one of a logical channel ID and a radio bearer ID; the K data sets of the first service are transmitted at the same time by respectively applying the K IDs in the first ID set and the K IDs in the second ID set.

Specifically, according to one aspect of the present disclosure, the first signaling indicates K flows of the first service, the K flows of the first service respectively correspond to the K data sets, and the K flows of the first service are mapped onto a same radio bearer.

Specifically, according to one aspect of the present disclosure, first information is transmitted, and the first information is used to indicate K1 search space(s); each ID in the first ID set is a group common RNTI; each of the K IDs in the first ID set is associated with one of the K1 search space(s), wherein K1 is a positive integer not greater than K.

Specifically, according to one aspect of the present disclosure, a receiver of the first signaling, before determining the target ID, applies a second target ID to receive a second target data set; in response to determining the target ID, the receiver of the first signaling, resets or releases an RLC entity used to receive the second target data set; the second target data set belongs to the first service; the second target ID belongs to the first ID set; and the second target ID is different from the target ID.

Specifically, according to one aspect of the present disclosure, the second node is a UE.

Specifically, according to one aspect of the present disclosure, the second node is an IoT terminal.

Specifically, according to one aspect of the present disclosure, the second node is a relay.

Specifically, according to one aspect of the present disclosure, the second node is a vehicle terminal.

Specifically, according to one aspect of the present disclosure, the second node is an aircraft.

Specifically, according to one aspect of the present disclosure, the second node is a base station.

Specifically, according to one aspect of the present disclosure, the second node is a gateway.

Specifically, according to one aspect of the present disclosure, the second node is an access point.

The present disclosure provides a method in a first node for wireless communications, comprising:

a first receiver, receiving a first signaling, the first signaling being used to indicate a first ID set of a first service, the first service being a non-unicast service, and the first ID set comprising a plurality of IDs; determining a target ID; and applying the target ID to receive the target data set;

herein, the first service comprises K data sets, the target data set is one of the K data sets, K being a positive integer greater than 1; the first ID set comprises K IDs, and the target ID is one of the K IDs in the first ID set; the K data sets of the first service are respectively identified by the K IDs in the first ID set; any ID in the first ID set is one of a search space ID, a group common RNTI, a logical channel ID and a radio bearer ID; and a location of the first node is used to determine the target ID.

The present disclosure provides a second node for wireless communications, comprising:

a second transmitter, transmitting a first signaling, the first signaling being used to indicate a first ID set of a first service, the first service being a non-unicast service, and the first ID set comprising a plurality of IDs; a receiver of the first signaling determining a target ID and applying the target ID to receive the target data set;

herein, the first service comprises K data sets, the target data set is one of the K data sets, K being a positive integer greater than 1; the first ID set comprises K IDs, and the target ID is one of the K IDs in the first ID set; the K data sets of the first service are respectively identified by the K IDs in the first ID set; any ID in the first ID set is one of a search space ID, a group common RNTI, a logical channel ID and a radio bearer ID; and a location of the receiver of the first signaling is used to determine the target ID.

In one embodiment, the present disclosure has the following advantages over conventional schemes:

First of all, in the traditional TN system, a cell is generally not particularly large, at least not as large as a cell of NTN whose cell radius can reach hundreds of kilometers or even 500 kilometers. When cell-based or location-related services are provided in such a large cell, the problem of insufficient resolution of the cell will be encountered. If the method proposed in the present disclosure is not used, then location-related services are difficult to be supported in a relatively large cell.

Otherwise, if a large cell transmits each data related to a specific smaller area of a service in parallel, since it is a same service, and a UE cannot receive different contents through different cells to distinguish the data, a possible method is to receive all the data, and the user's application layer may be able to distinguish; however, this method costs more power and the amount of data received by the user is too large, which may cause that the user cannot receive other services at the same time, however, using the method proposed in the present disclosure, the user can only monitor/receive/detect data really needed by the user, which is relatively simple and power-saving.

In addition, in the traditional method, if a location-related service is transmitted, which generally takes one cell or even a plurality of cells as a unit and different cells or several cells as a unit to transmit different contents. When a UE moves to different areas, it can naturally receive different contents, therefore, it is transparent or almost transparent to the UE, and the UE does not need complex processing. But if a same large cell transmits a plurality of location-related service data in parallel, the required content data cannot be correctly determined without the user's participation; using the method proposed in the present disclosure, the user can correctly receive and only receive the required service data without too complex processing.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
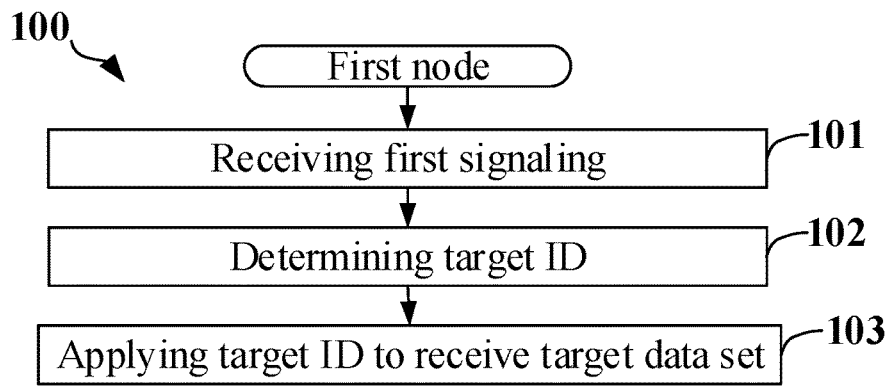
FIG. 1 illustrates a flowchart of receiving a first signaling, determining a target ID and applying a target ID to receive a target data set according to one embodiment of the present disclosure.

Embodiment 1 illustrates a flowchart of receiving a first signaling, determining a target ID and applying a target ID to receive a target data set according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, a first node in the present disclosure receives a first signaling in step 101; determines a target ID in step 102; and applies a target ID to receive a target data set in step 103;

herein, the first signaling is used to indicate a first ID set of a first service, the first service is a non-unicast service, and the first ID set comprises a plurality of IDs; the first service comprises K data sets, the target data set is one of the K data sets, K being a positive integer greater than 1; the first ID set comprises K IDs, and the target ID is one of the K IDs in the first ID set; the K data sets of the first service are respectively identified by the K IDs in the first ID set; any ID in the first ID set is one of a search space ID, a group common RNTI, a logical channel ID and a radio bearer ID; and a location of the first node is used to determine the target ID.

In one embodiment, the first node is a UE.

In one embodiment, the first signaling comprises an RRC signaling.

In one embodiment, the first signaling comprises an RRCReconfiguration.

In one embodiment, the first signaling comprises at least partial fields in an RRCReconfiguration.

In one embodiment, the first signaling comprises an RRCConnectionReconfiguration.

In one embodiment, the first signaling comprises an RRCRelease.

In one embodiment, the first signaling comprises a System Information Block (SIB).

In one embodiment, the first signaling comprises an SIB related to Multicast and Broadcast Service (s).

In one embodiment, the first signaling comprises a multicast related SIB.

In one embodiment, the first signaling comprises a V2X or ProSe related SIB.

In one embodiment, the first signaling comprises a sidelink related SIB.

In one embodiment, the first signaling is transmitted on a Multicast Control Channel (MCCH).

In one embodiment, the first signaling is transmitted on a Single Cell Multicast Control Channel (SC-MCCH).

In one embodiment, the first signaling is transmitted on a Broadcast Control Channel (BCCH).

In one embodiment, the first signaling is transmitted on a Sidelink Control Channel (SCCH).

In one embodiment, the first signaling is used to configure a Multicast Traffic Channel (MTCH).

In one embodiment, the first signaling is used to configure a Single Cell Multicast Traffic Channel (SC-MTCH).

In one embodiment, the first signaling is transmitted by broadcast.

In one embodiment, the first signaling is transmitted by unicast.

In one embodiment, the first signaling is periodically transmitted.

In one embodiment, when a groupcast service session changes, such as a session start or a session stop occurs in a groupcast service, the first signaling is transmitted.

In one embodiment, a transmitter of the first signaling is the same as a transmitter of the K data sets.

In one embodiment, a transmitter of the first signaling is different from a transmitter of the K data sets.

In one subembodiment of the embodiment, a transmitter of the first signaling is an MCG of the first node; and a transmitter of the K data sets is an SCG of the first node.

In one subembodiment of the embodiment, a transmitter of the first signaling is a Pcell of the first node; and a transmitter of the K data sets is an Scell of the first node.

In one subembodiment of the embodiment, a transmitter of the first signaling is a source cell of the first node; and a transmitter of the K data sets is a target cell of the first node.

In one subembodiment of the embodiment, a transmitter of the first signaling is a serving cell of the first node; and a transmitter of the K data sets is a relay of the first node.

In one subembodiment of the embodiment, a transmitter of the first signaling is a TN cell; and a transmitter of the K data sets is an NTN cell.

In one subembodiment of the embodiment, a transmitter of the first signaling is an NTN cell; and a transmitter of the K data sets is a TN cell.

In one embodiment, the first signaling is transmitted through a Signaling Radio Bearer (SRB).

In one embodiment, the first signaling is transmitted through a Signaling Radio Bearer0 (SRB0).

In one embodiment, the first signaling is transmitted through a Signaling Radio Bearer1 (SRB1).

In one embodiment, the first signaling is transmitted through a Signaling Radio Bearer2 (SRB2).

In one embodiment, the first signaling is transmitted through a Signaling Radio Bearer3 (SRB3).

In one embodiment, the first signaling comprises a USD of the first service.

In one embodiment, the first node receives a USD of the first service through a signaling of the core network.

In one embodiment, the first signaling is not transmitted through any SRB.

In one embodiment, the first service comprises a broadcast service.

In one embodiment, the first service comprises a groupcast service.

In one embodiment, the first service comprises a multicast service.

In one embodiment, the first service comprises a Multimedia Broadcast Multicast Service (MBMS).

In one embodiment, the first service comprises a Multicast/Broadcast Service (MBS).

In one embodiment, the first service comprises a 5G MBS service.

In one embodiment, the first service comprises a ProSe service.

In one embodiment, the first service comprises a V2X service.

In one embodiment, the first service comprises an intelligent transportation system (ITS) service.

In one embodiment, the first service comprises a local multicast service.

In one embodiment, the first service comprises a local dependent multicast service.

In one embodiment, the first ID set comprises at least two IDs.

In one embodiment, the first ID set comprises at least K IDs, K being an integer greater than 1.

In one embodiment, the K IDs in the first ID set respectively correspond to the K data sets.

In one embodiment, if one of the K data sets needs to be received, an ID in the first ID set corresponding to the one data set needs to be applied to receive.

In one embodiment, each ID in the first ID set is a search space ID.

In one embodiment, each ID in the first ID set is a common search space ID.

In one embodiment, each ID in the first ID set is a cell search space ID.

In one embodiment, each ID in the first ID set is a cell common search space ID.

In one embodiment, each ID in the first ID set is a SearchSpaceId.

In one embodiment, each ID in the first ID set is a group common Radio Network Tempory Identity (RNTI).

In one embodiment, each ID in the first ID set is a group common RNTI.

In one embodiment, each ID in the first ID set is a group-common RNTI.

In one embodiment, each ID in the first ID set is a G-RNTI.

In one embodiment, each ID in the first ID set is an M-RNTI.

In one embodiment, the group common RNTI comprises a group common RNTI.

In one embodiment, the group common RNTI comprises a group-common RNTI.

In one embodiment, the group common RNTI comprises a G-RNTI.

In one embodiment, the group common RNTI comprises an M-RNTI.

In one embodiment, the group common RNTI does not comprise a C-RNTI.

In one embodiment, each ID in the first ID set is a Logical Channel Identity (LCID).

In one embodiment, each ID in the first ID set is a radio bearer ID.

In one subembodiment of the embodiment, a radio bearer identified by the one radio bearer ID is a radio bearer used to transmit the first service.

In one embodiment, each of the K data sets at least comprises one data.

In one embodiment, each of the K data sets is non-empty.

In one embodiment, the K data sets are respectively transmitted through K radio bearers, and IDs of the K radio bearers are respectively the K IDs in the first ID set.

In one subembodiment of the above embodiment, the K radio bearers comprise a non-unicast bearer.

In one subembodiment of the above embodiment, the K radio bearers comprise a unicast bearer.

In one subembodiment of the above embodiment, the K radio bearers comprise a multicast and unicast bearer.

In one subembodiment of the above embodiment, the K radio bearers comprise a Multicast Radio Bearer (MRB).

In one subembodiment of the embodiment, the K radio bearers comprise a Single Cell MRB (SC-MRB).

In one subembodiment of the above embodiment, the K radio bearers comprise a Data Radio Bearer (DRB).

In one embodiment, the K data sets at least comprise two data sets.

In one embodiment, the K data sets comprise IP data.

In one embodiment, the K data sets comprise Ethernet data.

In one embodiment, the K data sets comprise UDP data.

In one embodiment, the K data sets comprise RTP data.

In one embodiment, the K data sets comprise TCP data.

In one embodiment, the K data sets comprise unconstructed data.

In one embodiment, the K data sets comprise application layer data.

In one embodiment, the K data sets comprise data from core network.

In one embodiment, the K data sets comprise NAS data.

In one embodiment, the K data sets comprise data of the first service.

In one embodiment, the K data sets comprise data of IP flow.

In one embodiment, the K data sets comprise data of QoS flow.

In one embodiment, the K data sets comprises a Service Data Adaptation Protocol (SDAP) PDU.

In one embodiment, the K data sets comprises a Service Data Adaptation Protocol (SDAP) data PDU.

In one embodiment, K is equal to 2.

In one embodiment, K is equal to 3.

In one embodiment, K is equal to 4.

In one embodiment, K is equal to 8.

In one embodiment, K is equal to 16.

In one embodiment, K is configurable.

In one embodiment, the K data sets comprise the target data set.

In one embodiment, the first ID set comprises the target ID.

In one embodiment, the first node and a first serving cell transmit the K data sets in parallel.

In one embodiment, the first node and a first serving cell transmit the K data sets at the same time.

In one embodiment, the K data sets are transmitted in a same cell.

In one embodiment, the K data sets are transmitted in a same cell group.

In one embodiment, transmissions of the K data sets are in no particular order of time.

In one embodiment, the K data sets can be transmitted at the same time in time, and UEs at different locations only receives one of the K data sets.

In one embodiment, there exists a one-to-one mapping relation between the K data sets and K IDs in the first ID set.

In one embodiment, a serving cell of the first node applies the K IDs to transmit the K data sets.

In one embodiment, a transmitter of the first signaling applies the K IDs to transmit the K data sets; and the K data sets are transmitted at the same time or in parallel.

In one embodiment, a first cell is any cell within a service area of the first service, and the first cell applies the K IDs to transmit the K data sets; the K data sets are transmitted at the same time or in parallel.

In one embodiment, the first signaling indicates a service ID of the first service, and a service ID of the first service is one of a Temporary Mobile Group Identity (TMGI) or a source IP address.

In one embodiment, the first signaling indicates a first session of the first service; and the K data sets of the first service belongs to the first session.

In one subembodiment of the embodiment, the first session comprises a PDU session.

In one subembodiment of the embodiment, the first session comprises an MBS PDU session.

In one subembodiment of the embodiment, the first session comprises a 5 MBS PDU session.

In one subembodiment of the embodiment, the first session comprises an MBMS PDU session.

In one subembodiment of the embodiment, the first session comprises an MBS distribution session.

In one embodiment, the first node receives the first service only using the target ID.

In one embodiment, the first node only receives the target data set in the K data sets.

In one embodiment, the K data sets are different from each other.

In one embodiment, the first service is an application layer service.

In one embodiment, the first ID set belongs to a same serving cell.

In one embodiment, the first ID set is configured by a same serving cell.

In one embodiment, a physical layer channel bearing the first service comprises a Physical Downlink Shared Channel (PDSCH).

In one embodiment, a physical layer channel bearing the first service comprises a Physical Sidelink Shared Channel (PSSCH).

In one embodiment, a physical channel bearing the first service utilizes a first sequence for scrambling.

In one subembodiment of the embodiment, the first sequence is an ID in the first ID set.

In one subembodiment of the embodiment, the first sequence is an ID in the first ID set, and each ID in the first ID set is a group common RNTI.

In one subembodiment of the embodiment, the first sequence is generated by a group common RNTI.

In one subembodiment of the embodiment, the first sequence is a pseudo-random sequence, and the first ID is used as an input parameter for generating the pseudo-random sequence.

In one subembodiment of the above embodiment, the first sequence a Gold sequence.

In one embodiment, a physical channel bearing the target data set uses a second sequence for scrambling.

In one subembodiment of the above embodiment, the second sequence is the target ID.

In one subembodiment of the embodiment, the target identity is a group common RNTI.

In one subembodiment of the embodiment, the second sequence is generated by a group common RNTI.

In one subembodiment of the embodiment, the second sequence is a pseudo-random sequence, and the target ID is used as an input parameter for generating the pseudo-random sequence.

In one subembodiment of the above embodiment, the second sequence a Gold sequence.

In one embodiment, a first control channel indicates time-frequency resources of a physical layer channel bearing the first service.

In one subembodiment of the above embodiment, the physical channel bearing the first service comprises a PDSCH.

In one subembodiment of the above embodiment, the physical channel bearing the first service comprises a PSSCH.

In one subembodiment of the embodiment, the first control channel comprises a Physical Downlink Control Channel (PDCCH).

In one subembodiment of the embodiment, the first control channel comprises a Physical Sidelink Control Channel (PSCCH).

In one subembodiment of the above embodiment, the first control channel is used to schedule the first service.

In one subembodiment of the above embodiment, the first control channel carries Downlink Control Information (DCI).

In one subembodiment of the embodiment, the first control channel carries Sidelink Control Information (SCI); and the SCI indicates time-frequency resources occupied by the physical layer channel bearing the first service.

In one subembodiment of the embodiment, the first control channel carries DCI, and the DCI indicates time-frequency resources occupied by the physical layer channel bearing the first service.

In one subembodiment of the embodiment, the first control channel employs an ID in the first ID set to scramble.

In one subembodiment of the embodiment, a Cyclic Redundancy Check (CRC) of the first control channel utilizes an ID in the first ID set for scrambling.

In one embodiment, a second control channel indicates time-frequency resources of a physical layer channel bearing the target data set.

In one subembodiment of the embodiment, the physical channel bearing the target data set comprises a PDSCH.

In one subembodiment of the embodiment, the physical channel bearing the target data set comprises a PSSCH.

In one subembodiment of the embodiment, the second control channel comprises a Physical Downlink Control Channel (PDCCH).

In one subembodiment of the embodiment, the second control channel comprises a Physical Sidelink Control Channel (PSCCH).

In one subembodiment of the embodiment, the second control channel is used to schedule the physical channel bearing the target data set.

In one subembodiment of the embodiment, the second control channel is used to schedule a MAC PDU carrying the target data set.

In one subembodiment of the above embodiment, the second control channel carries Downlink Control Information (DCI).

In one subembodiment of the embodiment, the second control channel carries Sidelink Control Information (SCI); and the SCI indicates time-frequency resources occupied by the physical layer channel bearing the target data set.

In one subembodiment of the embodiment, the second control channel carries DCI, and the DCI indicates time-frequency resources occupied by the physical later channel bearing the target data set.

In one subembodiment of the embodiment, the second control channel employs the target ID for scrambling.

In one subembodiment of the embodiment, a CRC employed by the second control channel utilizes the target ID for scrambling.

In one embodiment, a location of the first node is used to determine the target ID.

In one embodiment, the phrase of a location of the first node being used to determine the target ID includes the following meaning: there exists a mapping relation between different locations of the first node and different IDs in the first ID set, and the first node directly obtains the target ID through a current location.

In one embodiment, the phrase of a location of the first node being used to determine the target ID includes the following meaning: there exists a mapping relation between a geographical area to which different locations of the first node belongs and different IDs in the first ID set, the first node determines an area or a geographic area to which the current location belongs through a current location, and obtains the target ID through the area or the geographic area.

In one embodiment, the phrase of a location of the first node being used to determine the target ID includes the following meaning: the first node reports a location information report of the first node to a serving cell of the first node, and the serving cell of the first node determines the target ID according to location information of the first node.

In one embodiment, the phrase of a location of the first node being used to determine the target ID includes the following meaning: a location of the first node comprises at least one coordinate value in a specific geographic coordinate system, and there exists a mapping relation between an ID in the first ID set and the coordinate value of the first node.

In one embodiment, the phrase of a location of the first node being used to determine the target ID includes the following meaning: a location of the first node comprises at least one coordinate value in a specific geographic coordinate system, and an ID in the first ID set comprises at least partial bits of the coordinate value of the first node; and the target ID is determined through the at least partial bits.

In one embodiment, the phrase of a location of the first node being used to determine the target ID includes the following meaning: a location of the first node comprises at least one coordinate value in a specific geographic coordinate system, the coordinate value comprises at least partial bits of an ID in the first ID set, and the target ID is determined through at least partial bits in an ID in the comprised first ID set.

In one embodiment, the phrase of a location of the first node being used to determine the target ID includes the following meaning: an ID of a geographic area to which a location of the first node belongs and an ID in the first ID set comprise at least partial same bits; and the at least partial same bits are used to determine the target ID.

In one embodiment, the phrase of a location of the first node being used to determine the target ID includes the following meaning: a User Service Description (USD) of the first service comprises a mapping relation between a location of the first node and the target ID.

In one embodiment, the phrase of a location of the first node being used to determine the target ID includes the following meaning: a User Service Description (USD) of the first service comprises a mapping relation between an area to which a location of the first node belongs and the target ID.

In one embodiment, the phrase of a location of the first node being used to determine the target ID includes the following meaning: a location of the first node is determined by a Timing Advance (TA) from the first node to a serving cell, and there exists a mapping relation between a TA from the first node to a serving cell and an ID in the first ID set being used to determine the target ID.

In one embodiment, the first signaling indicates a first area set, the first area set comprises K areas, and the K areas in the first area set are respectively associated with the K IDs in the first ID set; and the first area set and a location of the first node are used together to determine the target ID.

In one subembodiment of the embodiment, the K areas in the first area set respectively correspond to the K IDs in the first ID set.

In one subembodiment of the embodiment, the K areas in the first area set are respectively mapping to the K IDs in the first ID set.

In one subembodiment of the embodiment, each area in the first area set is a sub area in the first area set; and the first signaling comprises IDs of K areas in the first area set.

In one subembodiment of the embodiment, the first signaling comprises an area ID in the first area set.

In one subembodiment of the embodiment, the first signaling comprises an ID in the K areas in the first area set.

In one subembodiment of the embodiment, the first signaling indicates coordinates of the K areas in the first area set; and a position of the first node belongs to an area in the first area set.

In one embodiment, the phrase of the applying the target ID to receive the target data set includes the following meaning: the target ID is a search space ID, the first node searches/monitors/blindly detects/receives a first physical control channel in a search space identified by the target ID, the first physical control channel comprises a PDCCH, DCI carried by the first physical control channel indicates time-frequency resources of a first physical channel, and the first physical channel carries the target data set.

In one embodiment, the phrase of the applying the target ID to receive the target data set includes the following meaning: the target ID is a search space ID, the first node searches/monitors/blindly detects/receives a first physical control channel in a search space identified by the target ID, the first physical control channel comprises a PSCCH, SCI carried by the first physical control channel indicates time-frequency resources of a first physical channel, and the first physical channel carries the target data set.

In one embodiment, the phrase of the applying the target ID to receive the target data set includes the following meaning: the target ID is a group common RNTI, the first node executes monitoring or blind detecting to receive corresponding DCI for the target ID, the DCI indicates time-frequency resources of a first physical channel, and the first physical carries the target data set.

In one embodiment, the phrase of the applying the target ID to receive the target data set includes the following meaning: the target ID is a group common RNTI, the first node executes monitoring or blind detecting to receive a corresponding SCI for the target ID, the SCI indicates time-frequency resources of a first physical channel, and the first physical carries the target data set.

In one embodiment, the phrase of the applying the target ID to receive the target data set includes the following meaning: the target ID is a group common RNTI, the first node employs the target ID to blindly detect a second physical control channel, the second physical control channel employs the target ID for scrambling, the second physical control channel carries second DCI, the second DCI indicates time-frequency resources of a second physical channel, and the second physical channel carries the target data set; and the second physical channel comprises a PDSCH.

In one embodiment, the phrase of the applying the target ID to receive the target data set includes the following meaning: the target ID is a logical channel ID, the first node receives a logical channel identified by the target ID, and the logical channel identified by the target ID carries the target data set.

In one embodiment, the phrase of the applying the target ID to receive the target data set includes the following meaning: the target ID is a logical channel ID, the first node reassembles data of a logical channel identified by the target ID to deliver it to an upper layer, and the logical channel identified by the target ID carries the target data set.

In one embodiment, the phrase of the applying the target ID to receive the target data set includes the following meaning: the target ID is a logical channel ID, and the first node discards data of a logical channel belonging to the first service other than a logical channel identified by the target ID.

In one embodiment, the phrase of the applying the target ID to receive the target data set includes the following meaning: the target ID is a radio bearer ID, and the first node receives a radio bearer identified by the target ID.

In one embodiment, the phrase of the applying the target ID to receive the target data set includes the following meaning: the target ID is a radio bearer ID, and the first node ignores or discards receiving a radio bearer of the first node other than a radio bearer identified by the target ID.

Embodiment 2

Figure 2:
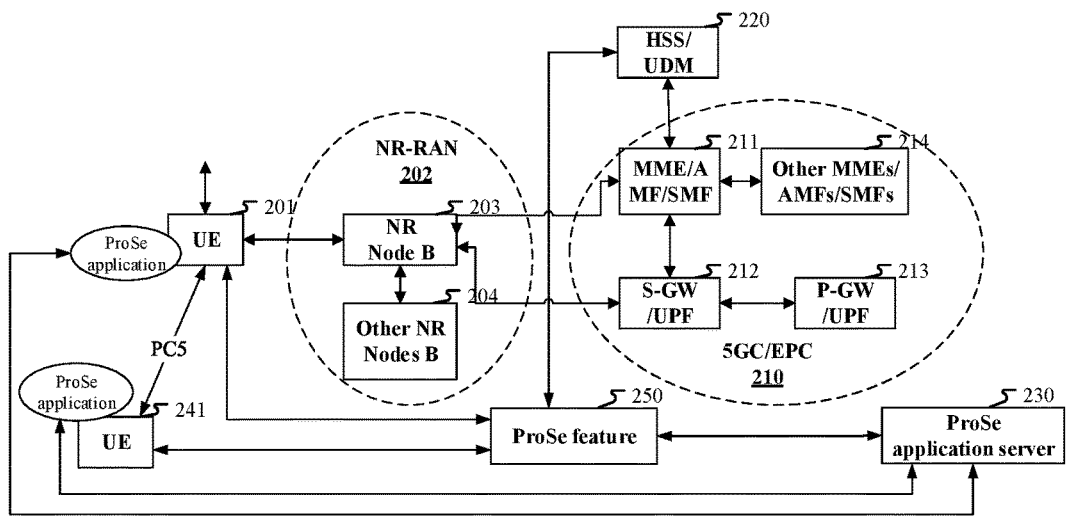
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LIE-A) systems. The 5G NR or LIE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an SING interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports NTN communications.

In one embodiment, the UE 201 supports communications within networks with large delay differences.

In one embodiment, the UE 201 supports V2X transmission.

In one embodiment, the UE 201 supports MBS transmission.

In one embodiment, the UE 201 supports MBMS transmission.

In one embodiment, the gNB 203 corresponds to the second node in the present disclosure.

In one embodiment, the gNB 203 supports communications within NTN.

In one embodiment, the gNB 203 supports communications within networks with large delay differences.

In one embodiment, the gNB 203 supports V2X transmission.

In one embodiment, the gNB 203 supports MBS transmission.

In one embodiment, the gNB 203 supports MBMS transmission.

Embodiment 3

Figure 3:
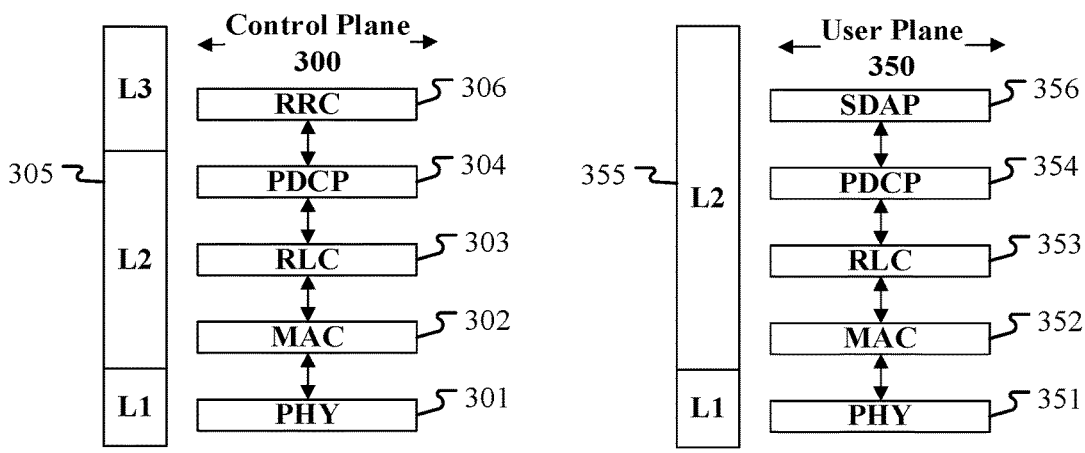
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first node (UE, gNB or a satellite or an aircraft in NTN) and a second node (gNB, UE or a satellite or an aircraft in NTN), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first node and a second node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second node and a first node. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in the figure, the first node may comprise several higher layers above the L2 305, also comprise a network layer (i.e., IP layer) terminated at a P-GW of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling in the present disclosure is generated by the RRC 306 or a Non-Access Stratum (NAS) layer.

In one embodiment, the K data sets in the present disclosure are generated by the PHY 351 or the MAC 352 or the RLC 353 or the PDCP 354 or the SDAP 356 or a higher layer.

In one embodiment, the first message in the present disclosure is generated by the RRC 306 or a Non-Access Stratum (NAS) layer.

In one embodiment, the second signaling in the present disclosure is generated by the RRC 306 or a Non-Access Stratum (NAS) layer.

In one embodiment, the first information in the present disclosure is generate by the PHY 301 or the MAC 302 or the RRC 306 or the NAS layer.

Embodiment 4

Figure 4:
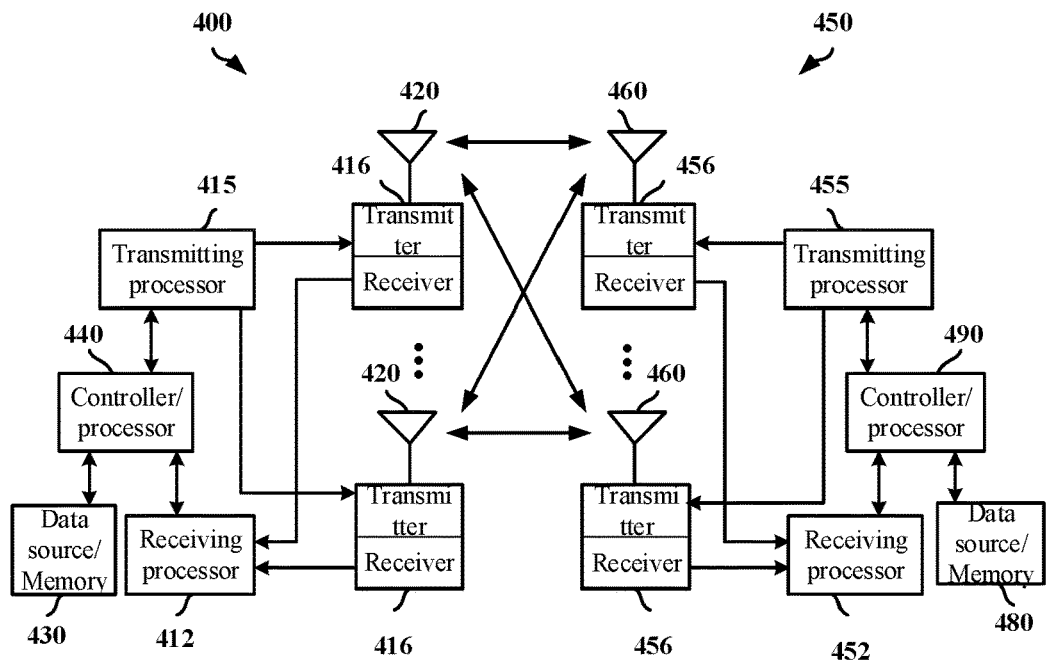
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least receives a first signaling, the first signaling is used to indicate a first ID set of a first service, the first service is a non-unicast service, and the first ID set comprises a plurality of IDs; determines a target ID; and applies the target ID to receive the target data set; herein, the first service comprises K data sets, the target data set is one of the K data sets, K being a positive integer greater than 1; the first ID set comprises K IDs, and the target ID is one of the K IDs in the first ID set; the K data sets of the first service are respectively identified by the K IDs in the first ID set; any ID in the first ID set is one of a search space ID, a group common RNTI, a logical channel ID and a radio bearer ID; and a location of the first node is used to determine the target ID.

In one embodiment, the first communication device 450 comprises at least one processor and at least one memory. a memory that stores a computer readable instruction program. The computer readable instruction program generates an action when executed by at least one processor. The action includes: receiving a first signaling, the first signaling being used to indicate a first ID set of a first service, the first service being a non-unicast service, and the first ID set comprising a plurality of IDs; determining a target ID; and applying the target ID to receive the target data set; herein, the first service comprises K data sets, the target data set is one of the K data sets, K being a positive integer greater than 1; the first ID set comprises K IDs, and the target ID is one of the K IDs in the first ID set; the K data sets of the first service are respectively identified by the K IDs in the first ID set; any ID in the first ID set is one of a search space ID, a group common RNTI, a logical channel ID and a radio bearer ID; and a location of the first node is used to determine the target ID.

In one embodiment, the second communication node 410 comprises at least one processor and at least one memory. The at least one memory comprises computer program codes; the at least one memory and the computer program codes are configured to be used in collaboration with the at least one processor. The second communication device 410 at least transmits a first signaling, the first signaling is used to indicate a first ID set of a first service, the first service is a non-unicast service, and the first ID set comprises a plurality of IDs; a receiver of the first signaling determines a target ID and applies the target ID to receive the target data set; herein, the first service comprises K data sets, the target data set is one of the K data sets, K being a positive integer greater than 1; the first ID set comprises K IDs, and the target ID is one of the K IDs in the first ID set; the K data sets of the first service are respectively identified by the K IDs in the first ID set; any ID in the first ID set is one of a search space ID, a group common RNTI, a logical channel ID and a radio bearer ID; and a location of the receiver of the first signaling is used to determine the target ID.

In one embodiment, the second communication node 410 comprises a memory that stores a computer readable instruction program. The computer readable instruction program generates an action when executed by at least one processor. The action includes: transmitting a first signaling, the first signaling being used to indicate a first ID set of a first service, the first service being a non-unicast service, and the first ID set comprising a plurality of IDs; a receiver of the first signaling determining a target ID and applying the target ID to receive the target data set; herein, the first service comprises K data sets, the target data set is one of the K data sets, K being a positive integer greater than 1; the first ID set comprises K IDs, and the target ID is one of the K IDs in the first ID set; the K data sets of the first service are respectively identified by the K IDs in the first ID set; any ID in the first ID set is one of a search space ID, a group common RNTI, a logical channel ID and a radio bearer ID; and a location of the receiver of the first signaling is used to determine the target ID.

In one embodiment, the first communication device 450 corresponds to a first node in the present disclosure.

In one embodiment, the second communication device 410 corresponds to a second node in the present disclosure.

In one embodiment, the first communication device 450 is a UE.

In one embodiment, the first communication device 450 is a vehicle terminal.

In one embodiment, the second communication device 450 is a relay.

In one embodiment, the second communication device 450 is a satellite.

In one embodiment, the second communication device 410 is a base station.

In one embodiment, the second communication device 410 is a relay.

In one embodiment, the second communication device 410 is a UE.

In one embodiment, the second communication device 410 is a satellite.

In one embodiment, the receiver 456 (including the antenna 460), the receiving processor 452 and the controller/processor 490 are used to receive the first signaling in the present disclosure.

In one embodiment, the receiver 456 (including the antenna 460), the receiving processor 452 and the controller/processor 490 are used to receive the target data set in the present disclosure.

In one embodiment, the receiver 456 (including the antenna 460), the receiving processor 452 and the controller/processor 490 are used to receive the second signaling in the present disclosure.

In one embodiment, the receiver 456 (including the antenna 460), the receiving processor 452 and the controller/processor 490 are used to receive the first information in the present disclosure.

In one embodiment, the transmitter 456 (including the antenna 460), the transmitting processor 455 and the controller/processor 490 are to transmit the first message in the present disclosure.

In one embodiment, the transmitter 416 (including the antenna 420), the transmitting processor 412 and the controller/processor 440 are used to transmit the first signaling in the present disclosure.

In one embodiment, the transmitter 416 (including the antenna 420), the transmitting processor 412 and the controller/processor 440 are used to transmit the K data sets in the present disclosure.

In one embodiment, the transmitter 416 (including the antenna 420), the transmitting processor 412 and the controller/processor 440 are used to transmit the second signaling in the present disclosure.

In one embodiment, the transmitter 416 (including the antenna 420), the transmitting processor 412 and the controller/processor 440 are used to transmit the first information in the present disclosure.

In one embodiment, the receiver 416 (including the antenna 420), the receiving processor 412 and the controller/processor 440 are used to receive the first message in the present disclosure.

Embodiment 5

Figure 5:
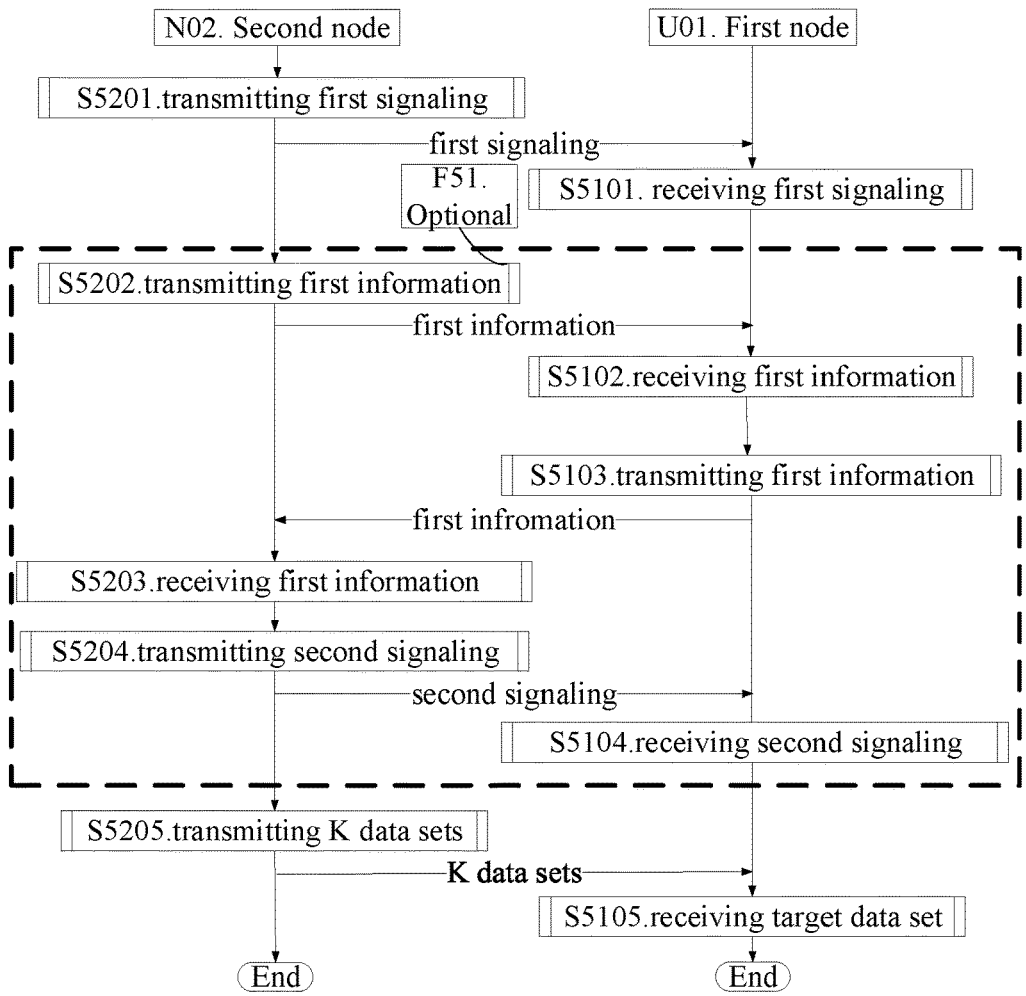
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, U01 corresponds to a first node in the present disclosure, and N02 corresponds to a second node in the present disclosure. It is particularly underlined that the order illustrated in the embodiment does not put constraints over sequences of signal transmissions and implementations and steps in F51 are optional.

The first node U01 receives a first signaling in step S5101; receives first information in step S5102; transmits a first message in step S5103; receives a second signaling in step S5104; and receives a target data set in step S5105.

The second node N02 transmits a first signaling in step S5201; transmits first information in step S5202; receives a first message in step S5203; transmits a second signaling in step S5204; and transmits K data sets in step S5205.

In embodiment 5, the first signaling is used to indicate a first ID set of a first service, the first service is a non-unicast service, and the first ID set comprises a plurality of IDs; determines a target ID; and applies the target ID to receive the target data set; the first service comprises K data sets, the target data set is one of the K data sets, K being a positive integer greater than 1; the first ID set comprises K IDs, and the target ID is one of the K IDs in the first ID set; the K data sets of the first service are respectively identified by the K IDs in the first ID set; any ID in the first ID set is one of a search space ID, a group common RNTI, a logical channel ID and a radio bearer ID; and a location of the first node U01 is used to determine the target ID.

In one embodiment, the first node U01 is a UE.

In one embodiment, the first node U01 is a relay.

In one embodiment, the second node N02 is a UE.

In one embodiment, the second node N02 is a base station.

In one embodiment, the second node N02 is a serving cell of the first node U01.

In one embodiment, the second node N02 is a cell group of the first node U01.

In one embodiment, the second node N02 is a PCell of the first node U01.

In one embodiment, the second node N02 is a SCell of the first node U01.

In one embodiment, the second node N02 is a SpCell of the first node U01.

In one embodiment, an interface that the second node N02 is in communications with the first node U01 comprises Uu.

In one embodiment, an interface that the second node N02 is in communications with the first node U01 comprises PC5.

In one embodiment, the second node N02 is a source cell or a target cell of the first node U01.

In one embodiment, the first node U01 is located within a serving cell of the first service.

In one subembodiment of the embodiment, the first node U01 must be within a sub-area of the first service, and the one sub-area of the first service corresponds to one of the K data sets.

In one subembodiment of the embodiment, the first node U01 determines that the first node U01 is located within a serving cell of the first service through a USD of the first service and a serving cell of the first service indicated by a broadcast message transmitted by the first node U01.

In one subembodiment of the embodiment, a serving cell of the first service is indicated through a Service Area Identity (SAI).

In one embodiment, the first node U01 joins a groupcast group of the first service.

In one embodiment, the first signaling comprises a signaling in a procedure in which the first node U01 joins a groupcast group of the first service.

In one embodiment, the first signaling comprises an NAS signaling.

In one embodiment, the first information is used to indicate K1 search space(s); each ID in the first ID set is a group common RNTI; each of the K IDs in the first ID set is associated with one of the K1 search space(s), wherein K1 is a positive integer not greater than K.

In one embodiment, the first signaling comprises the first information.

In one embodiment, the first information comprises an RRC message.

In one embodiment, the first information comprises a MAC Control Element (CE).

In one embodiment, the first information comprises DCI.

In one embodiment, the first information comprises SCI.

In one embodiment, the first information indicates an ID or index of the K1 search spaces.

In one embodiment, K1 is equal to K.

In one embodiment, the first information is transmitted by unicast.

In one embodiment, the first information is transmitted in a broadcast or groupcast way.

In one embodiment, the first information and the K data sets are transmitted through different radio bearers.

In one embodiment, the first message is used to indicate at least one of location information of the first node U01 or a first area ID; and location information of the first node U01 is used to determine the first area ID.

In one subembodiment of the embodiment, the first area ID is used to identify a first area.

In one subembodiment of the embodiment, the first node U01 is located within the first area.

In one subembodiment of the embodiment, location information of the first node U01 indicates that the first node U01 is located within the first area.

In one subembodiment of the embodiment, the first area belongs to a serving cell of the first service.

In one subembodiment of the embodiment, the first area is an area within a serving cell of the first service.

In one subembodiment of the embodiment, a serving cell of the first service comprises K areas, the first area is one of the K areas, and the K areas respectively correspond to the K data sets.

In one subembodiment of the embodiment, location information of the first node U01 can uniquely determine which of the K areas a location of the first node U01 belongs to.

In one subembodiment of the embodiment, the first signaling indicates a first area set, and the first area set comprises K areas.

In one embodiment, the first message comprises an RRC message.

In one embodiment, the first message comprises a NAS message.

In one embodiment, the first message comprises an RRCSetupRequest message.

In one embodiment, the first message comprises an RRCResumeRequest message.

In one embodiment, the first message comprises a UEAssistanceInformation.

In one embodiment, the first message comprises an InterestIndication.

In one embodiment, the first message comprises an MBMSInterestIndication.

In one embodiment, the first message comprises an MBSInterestIndication.

In one embodiment, the first message comprises a ULInformationTransfer.

In one embodiment, the first message comprises a ULInformationTransferMRDC.

In one embodiment, the first message comprises a UEInformationResponse.

In one embodiment, the first message comprises UECapabilityInformation.

In one embodiment, the first message comprises an RRCReconfigurationComplete.

In one embodiment, the first message comprises SCGFailureInformation.

In one embodiment, the first message comprises MCGFailureInformation.

In one embodiment, the first message comprises a LocationMeasurementIndication.

In one embodiment, the second signaling indicates the target ID.

In one embodiment, the first comprises the second signaling.

In one embodiment, the first signaling comprises at least partial fields in the second signaling.

In one embodiment, the first signaling and the second signaling are different signalings.

In one embodiment, the first signaling and the second signaling are different RRC signalings.

In one embodiment, the second signaling comprises an RRCReconfiguration.

In one embodiment, the second signaling comprises at least partial fields in an RRCReconfiguration.

In one embodiment, the second signaling comprises an RRCConnectionReconfiguration.

In one embodiment, the second signaling comprises an RRCRelease.

In one embodiment, the second signaling is transmitted by unicast.

In one embodiment, a physical channel occupied by the second signaling comprises a PDSCH.

In one embodiment, the first message is used to trigger the second signaling.

In one embodiment, a physical channel occupied by the first message comprises a Physical Uplink Shared Channel (PUSCH).

In one embodiment, the first signaling indicates a first area set, the first area set comprises K areas, and the K areas in the first area set are respectively associated with the K IDs in the first ID set; and the first area set and a location of the first node U01 are used to determine the target ID.

In one subembodiment of the embodiment, the first node U01 transmits the first message, and the first message indicates the first area ID; and a location of the first node U01 is used to determine the first area ID.

In one subembodiment of the embodiment, the first node U01 transmits the first message, and the first message indicates the target ID; a location of the first node U01 is used to determine the first area ID; and the first area ID corresponds to the target ID.

In one subembodiment of the embodiment, the first node U01 transmits a second message, and the second message indicates the target ID. A location of the first node U01 belongs to one of the K areas, an area in the first area set to which a location of the first node U01 belongs is a target area, the target area corresponds to the target ID in the first ID set, and the target area in the first area set respectively corresponds to or maps to the target ID in the first ID set.

In one subembodiment of the embodiment, a receiver of the second message is the second node N02.

In one subembodiment of the embodiment, the second node N02 transmits a second configuration message, and the first node U01 receives a second configuration message; the second configuration message indicates a first RNTI; the first RNTI is a C-RNTI; the first RNTI is used to scramble a third physical channel transmitting the first service; and the first RNTI is used to scramble a PDCCH channel scheduling the third physical channel.

In one subembodiment of the embodiment, the third physical channel is a PDSCH channel, and the third physical channel is used to carry the target data set.

In one subembodiment of the embodiment, the third physical channel is only used to carry the target data set in the K data sets.

In one subembodiment of the embodiment, the second message is used to trigger the second configuration message.

In one subembodiment of the embodiment, the first node U01 utilizes the first RNTI for blind detection.

In one subembodiment of the embodiment, the first node U01 receives the third physical channel.

In one subembodiment of the embodiment, the first node U01 receives the target data set.

In one subembodiment of the embodiment, the second configuration message comprises an RRC message.

In one subembodiment of the embodiment, the second configuration message comprises an RRCReconfiguration message.

In one subembodiment of the embodiment, the second configuration message comprises an RRCConnectionReconfiguration message.

In one subembodiment of the embodiment, the second configuration message comprises an RRCSetup message.

In one subembodiment of the embodiment, the second configuration message comprises an RRCResume message.

In one subembodiment of the embodiment, the second configuration message comprises an RRCReestablishment message.

In one embodiment, the advantage of the above method is that when a UE determines a target ID according to its own location, the UE directly indicates the determined target ID to the network, and the network can configure relevant transmission parameters according to the target ID, such as comprising G-RNTI or C-RNTI, logical channel or radio bearer or scheduling information, and the network can better support point-to-point (PTP) transmission.

In one embodiment, the first signaling indicates K flows of the first service, the K flows of the first service respectively correspond to the K data sets, and the K flows of the first service are mapped onto a same radio bearer.

In one subembodiment of the embodiment, the K flows comprises IP flow.

In one subembodiment of the embodiment, the K flows comprise QoS flow.

In one subembodiment of the embodiment, the K flows comprise MBS flow.

In one subembodiment of the embodiment, the K flows comprises multicast flow.

In one subembodiment of the embodiment, there exists a one-to-one mapping relation between the K flows and the K data sets.

In one subembodiment of the embodiment, receiving one of the K data sets means receiving one of the K flows corresponding to one of the K data sets.

In one subembodiment of the embodiment, the K flows of the first service are mapped to a same radio bearer, and the same radio bearer to which the K flows of the first service are mapped is a third radio bearer; and the third radio bearer is a non-unicaset bearer.

In one subembodiment of the embodiment, the third radio bearer is a groupcast bearer.

In one subembodiment of the embodiment, the K flows of the first service are mapped to a same radio bearer to receive.

In one subembodiment of the embodiment, the first node U01 utilizes a PDCP entity to receive the first service.

In one subembodiment of the embodiment, the second node N02 utilizes a plurality of PDCP entities to receive the K flows of the first service.

In one subembodiment of the embodiment, any ID in the first ID set is a group common RNTI.

In one subembodiment of the embodiment, any ID in the first ID set is a logical channel ID.

In one subembodiment of the embodiment, any ID in the first ID set is a search space ID.

In one embodiment, each ID in the first ID set is a group common RNTI; the first signaling indicates a second ID set, and the second ID set comprises K IDs; the K IDs in the second ID set respectively correspond to the K IDs in the first ID set; any ID in the second ID set is one of a logical channel ID and a radio bearer ID; the K data sets of the first service are transmitted at the same time by respectively applying the K IDs in the first ID set and the K IDs in the second ID set.

In one embodiment, the first signaling indicates a third ID set, and the third ID set comprises K×1 ID(s), where K×1 is a positive integer; any ID in the third ID set is a search space ID; the target ID is an ID in the third ID set; there exists a mapping relation between the third target ID and the target ID, or, there exists a mapping relation between an area where the first node U01 is located and the third target ID; the first node U01 determines the third target ID according to the target ID or an area where the first node U01 is located; the target ID is an ID other than a search space ID; the first node U01 detects a PDCCH used for scheduling a third target physical channel in a search space identified by the third target ID, and the third target physical channel is used to carry the target data set; and the first node U01 receives the third target physical channel.

In one embodiment, the first signaling indicates a fourth ID set, and the fourth ID set comprises K×2 ID(s), where K×2 is a positive integer; any ID in the fourth ID set is a group common RNTI; the fourth target ID is an ID in the fourth ID set; there exists a mapping relation between the fourth target ID and the target ID, or, there exists a mapping relation between an area where the first node U01 is located and the fourth target ID; the first node U01 determines the fourth target ID according to the target ID or an area where the first node is located; the target ID is an ID other than a group common RNTI; the first node U01 detects a fourth PDCCH used for scheduling a fourth target physical channel, and the fourth target physical channel is used for carrying the target data set; the first node U01 receives the fourth target physical channel, and the fourth target physical channel comprises a PDSCH; the fourth PDCCH uses the fourth target ID for scrambling.

In one embodiment, the first signaling indicates a fifth ID set, and the fifth ID set comprises K×3 ID(s), where K×3 is a positive integer; any ID in the fifth ID set is a logical channel ID; a fifth target ID is an ID in the fifth ID set; there exists a mapping relation between the fifth target ID and the target ID, or, there exists a mapping relation between an area where the first node U01 is located and the fifth target ID; the first node U01 determines the fifth target ID according to the target ID or an area where the first node is located; the target ID is an ID other than a logical channel ID; the first node U01 receives a logical channel identified by the fifth target ID; and a logical channel identified by the fifth target ID carries the target data set.

In one embodiment, the first signaling indicates a sixth ID set, and the sixth ID set comprises K×4 ID(s), where K×4 is a positive integer; any ID in the sixth ID set is a radio bearer ID; the sixth target ID is an ID in the sixth ID set; there exists a mapping relation between the sixth target ID and the target ID, or, there exists a mapping relation between an area where the first node U01 is located and the sixth target ID; the first node U01 determines the sixth target ID according to the target ID or an area where the first node U01 is located; the target ID is an ID other than a radio bearer ID; a sixth logical channel is used to carry data of the sixth radio bearer; the first node U01 hands over data of the sixth radio bearer on the sixth logical channel to a sixth PDCP entity, and the sixth PDCP entity corresponds to the sixth radio bearer.

In one embodiment, a location of the first node U01 is used to determine an area where the first node U01 is located.

In one embodiment, K×1 is equal to K.
In one embodiment, K×2 is equal to K.
In one embodiment, K×3 is equal to K.
In one embodiment, K×4 is equal to K.
In one embodiment, the second node N02 transmits K data sets, and the first node U01 only receives the target data set.

Embodiment 6

Figure 6:
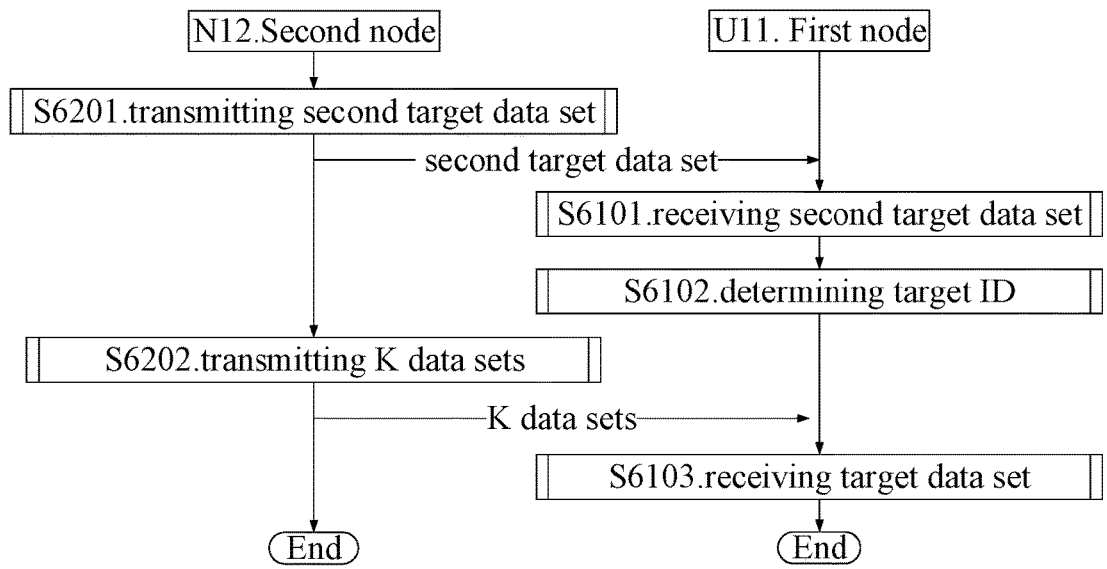
FIG. 6 illustrates a flowchart of a radio signal transmission according to one embodiment of the present disclosure.

Embodiment 6 illustrates a flowchart of radio signal transmission according to one embodiment of the present disclosure, as shown in FIG. 6. In FIG. 6, U11 corresponds to a first node in the present disclosure, N12 corresponds to a second node in the present disclosure. It is particularly underlined that the order illustrated in the embodiment does not put constraints over sequences of signal transmissions and implementations. Embodiment 6 is based on embodiment 5, and the parts required but not explicitly shown in embodiment 6 can refer to embodiment 5.

The first node U11 receives a second target data set in step S6101; determines a target ID in step S6102; and receives a target data set in step S6103.

The second node N12 transmits a second target data set in step S6201; and transmits K data sets in step S6202.

In one embodiment, before determining the target ID, the first node U1f applies a second target ID to receive a second target data set; the second target data set belongs to the first service; the second target ID belongs to the first ID set; and the second target ID is different from the target ID.

In one embodiment, in response to determining the target ID, the first node U11 resets or releases an RLC entity used to receive the second target data set.

In one embodiment, the first service comprises K flows, the K flows respectively correspond to the K data sets, and the target data set corresponds to a target flow in the K flows.

In one embodiment, the second target data set corresponds to/maps to/is associated with a flow other than the target flow in the K flows.

In one embodiment, the second node N12 transmits a second data total set while transmitting the second target data set, and the second data total set comprises K−1 data subset(s); the K−1 data subset(s) and the second target data set respectively correspond to the K flows, herein, the second target data set corresponds to a second target flow in the K flows, and the K−1 data subset(s) corresponds (respectively correspond) to K−1 flow(s) other than the second target flow in the K flows.

In one embodiment, in step S6102, the first node U11 determines the target ID according to a location of the first node U11.

In one embodiment, the second target ID is a search space ID.

In one embodiment, the second target ID is a group common RNTI.

In one embodiment, the second target ID is a logical channel ID.

In one embodiment, the second target ID is a radio bearer ID.

In one embodiment, the phrase of the first node U11 applying a second target ID to receive a second target data set includes the following meaning: the second target ID is a search space ID, the first node U11 detects a PDCCH channel in a search space identified by the second target ID, the PDCCH channel detected in a search space identified by the second target ID is used to indicate time-frequency resources of a first prior physical channel carrying the second target data set, and the first node U01 receives the second target data set through receiving the first prior physical channel.

In one embodiment, the phrase of the first node U11 applying a second target ID to receive a second target data set includes the following meaning: the second target ID is group common RNTI, the first node U11 detects a PDCCH channel scrambled by the second target ID, the PDCCH channel scrambled by the second target ID detected by the first node U11 indicates a second prior physical channel carrying the second target data set, and the first node U11 receives the second target data set through receiving the second prior physical channel.

In one embodiment, the phrase of the first node U1f applying a second target ID to receive a second target data set includes the following meaning: the second target ID is a logical channel ID, a logical channel identified by the second target ID is used to carry the second target data set, and the first node U11 receives the second target data set through receiving a logical channel indicated by the second target ID.

In one embodiment, the phrase of the first node U1f applying a second target ID to receive a second target data set includes the following meaning: the second target ID is a radio bearer ID, and a radio bearer identified by the second target ID is associated with a second target PDCP entity; the target data set is carried through a second target logical channel, and the first node U11 hands over data of the received second target logical channel to the second target PDCP entity for processing.

In one embodiment, in response to determining the target ID, the first node U11 resets an RLC entity used to receive the second target data set.

In one subembodiment of the embodiment, the behavior of the determining the target ID to trigger the first node U11 to receive the target data set, receiving or preparing to receive the target data set triggers the first node U11 to reset an RLC entity used to receive the second target data set.

In one embodiment, in response to determining the target ID, the first node U11 releases an RLC entity used to receive the second target data set.

In one subembodiment of the embodiment, the behavior of the determining the target ID to trigger the first node U11 to receive the target data set, receiving or preparing to receive the target data set triggers the first node to release an RLC entity used to receive the second target data set.

In one subembodiment of the embodiment, the first node U11 establishes an RLC entity used to receive the target data set.

Embodiment 7

Figure 7:
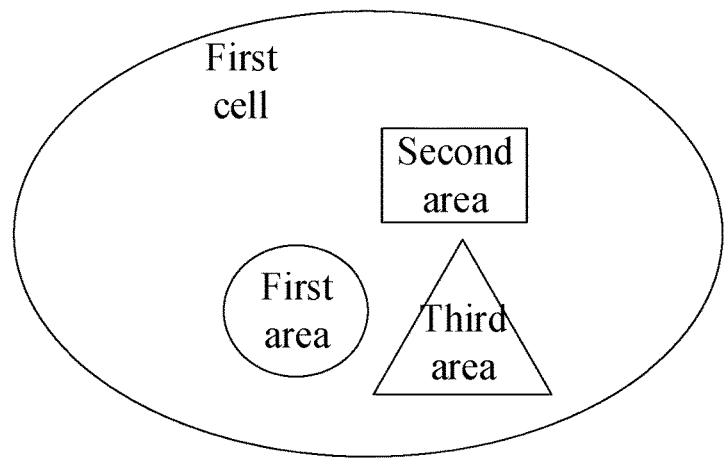
FIG. 7 illustrates a schematic diagram of a plurality of areas according to one embodiment of the present disclosure.

Embodiment 7 illustrates a schematic diagram of a plurality of areas according to one embodiment of the present disclosure, as shown in FIG. 7. A cell in FIG. 7 comprises several areas, comprising a first area, a second area and a third area, which can also be named sub-area or similar terms; actually, scenarios to which the present disclosure applies does not limit the number of areas, as long as there is more than more. The three areas in FIG. 7 have different shapes to illustrate that the shapes of the areas can be different, such as circle or polygon. The method proposed in the present disclosure does not limit the shape and size of the area, and the shape of the area does not need to be circular, triangular or rectangular. The areas in FIG. 7 are discontinuous, which is only one embodiment. In fact, the scenarios applicable to the present disclosure does not limit whether these areas are continuous or not.

In one embodiment, the first cell is a serving cell of the first node.

In one embodiment, K is equal to 3, that is the first service comprises 3 data sets, which are respectively a first data set, a second data set and a third data set; the first ID set comprises 3 IDs, which are respectively a first ID, a second ID and a third ID.

In one embodiment, a first data set in the three data sets is applicable to a UE of the first area; a second data set in the three data sets is applicable to a UE of the second area; and a third data set in the three data sets is applicable to a UE of the third area.

In one embodiment, a first ID in the first ID set is associated with the first area; a second ID in the first ID set is associated with the second area; and a third ID in the first ID set is associated with the third area.

In one embodiment, when the first node is located within the first area, the first ID in the first ID set is determined as the target ID; when the first node is located within the second area, and the second ID in the first ID set is determined as the target ID; and when the first node is located within the third area, and the third ID in the first ID set is determined as the target ID.

In one embodiment, when the first ID in the first ID set is determined as the target ID, the first node only receives the first data set; when the second ID in the first ID set is determined as the target ID, the first node only receives the second data set; and when the third ID in the first ID set is determined as the target ID, the first node only receives the third data set.

In one embodiment, a serving cell of the first service comprises the first area and the second area and the third area.

In one embodiment, the first message is used to indicate location information of the first node, and the second signaling indicates the target ID.

In one embodiment, the first message comprises location information of the first node.

In one embodiment, the first message comprises coordinates of the first node.

In one embodiment, the first message comprises coordinates and a coordinate system of the first node.

In one embodiment, the first message is used to indicate a first area ID of the first node; when the first node is located within the first area, the first area ID is determined as an ID of the first area; when the first node is located within the second area, the first area ID is determined as an ID of the second area; and when the first node is located within the third area, the first area ID is determined as an ID of the third area.

In one embodiment, the first message comprises the first area ID.

In one embodiment, the second signaling indicates the target ID.

In one embodiment, the first signaling indicates a first area set, the first area set comprises K areas, and the K areas in the first area set are respectively associated with the K IDs in the first ID set; and the first area set and a location of the first node are used together to determine the target ID.

In one embodiment, the first area set comprises the first area and the second area and the third area.

In one embodiment, the K areas in the first area set are respectively mapping to the K IDs in the first ID set.

In one embodiment, the first node indicates the determined target ID to a transmitter of the first signaling.

In one embodiment, the advantage of the above method is that the UE notifies the network of its selected area, which can assist the network in making targeted configuration for the UE, for example, in the mobility management procedure and in scheduling, and is also conducive to the network transmitting a target data set of the first service to the UE by using the method of PTP.

Embodiment 8

Figure 8:
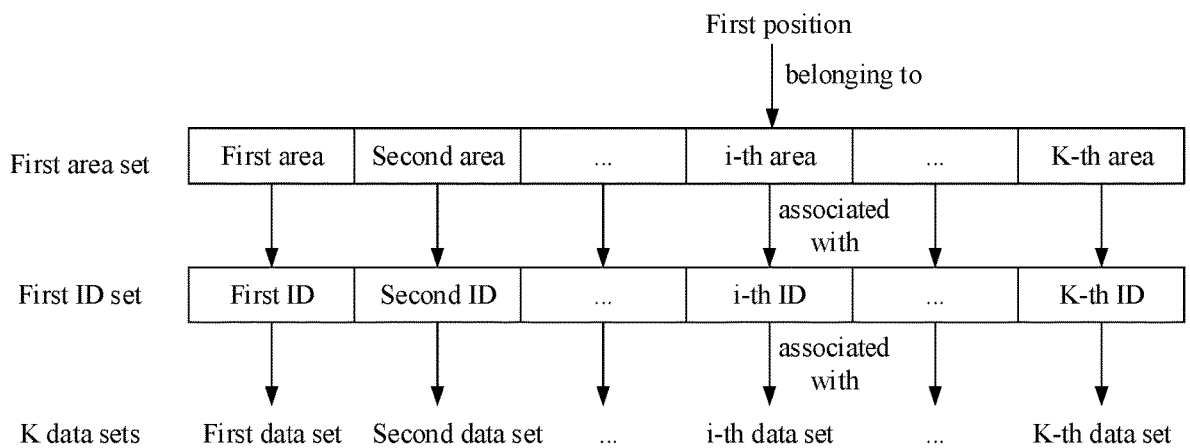
FIG. 8 illustrates a schematic diagram of determining a target ID according to one embodiment of the present disclosure.

Embodiment 8 illustrates a schematic diagram of determining a target ID according to one embodiment of the present application, as shown in FIG. 8. A first location in FIG. 8 is a location of the first node.

In one embodiment, a first area set comprises K areas; and the first ID set comprises K IDs.

In one embodiment, the first location belongs to an i-th area in the first area set, where a value of i ranging from 1 to K.

In one embodiment, the first location is within the i-th area.

In one embodiment, there exists a one-to-one mapping relation between an area in the first area set and an ID in the first ID set, and an ID in the first ID set mapped to the area in the first area set can be uniquely determined according to an area in the first area set.

In one embodiment, there exists a one-to-one corresponding relation between data sets in the K data sets and an ID in the first ID set; an i-th ID can be applied to receive an i-th data set; receiving an i-th data set requires the application of an i-th data set.

In one embodiment, the first signaling indicates the first area set.

In one embodiment, the first signaling indicates a mapping or the association relation between the first area set and the first ID set.

In one embodiment, a USD of the first service indicates a mapping or an association relation between the first area set and the first ID set.

In one embodiment, a USD of the first service indicates a coordinate system of a location of the first node.

In one embodiment, the first signaling indicates a mapping or association relation between the first ID set and the K data sets.

In one embodiment, when the first node is located within the i-th area, the first node only receives the i-th data set.

Embodiment 9

Figure 9:
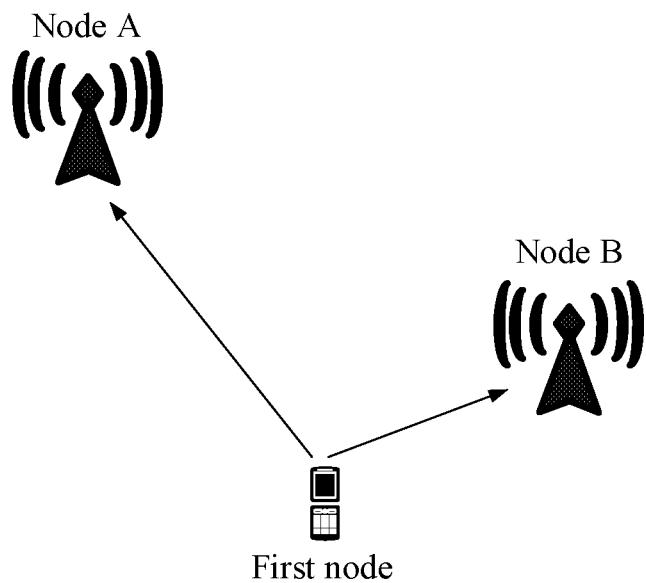
FIG. 9 illustrates a schematic diagram of a transmission of a first signaling and a target data set according to one embodiment of the present disclosure.

Embodiment 9 illustrates a schematic diagram of transmission of a first signaling and a target data set according to one embodiment of the present disclosure, as shown in FIG. 9. In FIG. 9, a first node corresponds to the first node in the present disclosure, and the first node is in communications with two nodes, which are respectively node A and node B.

In one embodiment, the node A is a cell and the node B is a cell.

In one embodiment, the node A is a serving cell of the first node.

In one embodiment, the node B is a serving cell of the first node.

In one embodiment, the node A is a transmitter of the first signaling.

In one embodiment, the node B is a transmitter of the target data set.

In one embodiment, the node B is a transmitter of the K data sets.

In one embodiment, the node A belongs to an MCG, and the node B belongs to an SCG.

In one embodiment, the node A is a master node (MN), and the node B is a secondary node (SN).

In one embodiment, advantages of the above method include: the relevant configuration for receiving the target data set is transmitted by an MCG and an MN, the service is transmitted by another cell, which is conducive to improving efficiency and increasing flexibility; if a cell of the node is large, the method proposed in the present disclosure can give play to the advantages of large coverage and high efficiency of groupcast and multicast, for example, the cell or cell group of the node B is an NTN cell; if a cell of the node A is large, the method proposed in the present disclosure is conducive to the node A using a large coverage area for unified configuration, and the node B transmits service data related to the geographical area.

In one embodiment, the node A is a source cell and the node B is a target cell.

In one embodiment, the advantage of the above methods is that a UE can receive configuration of service of a target cell before or during handover, which is conducive to the continuity of data reception.

In one embodiment, the node A is a serving cell of the first node, and the node B is a relay of the first node.

In one embodiment, the node B only relays the target data set.

In one embodiment, the first node is a remote UE.

In one embodiment, the first node determines the target ID, and the first node indicates the target ID to the node B.

In one embodiment, the node B applies the target ID to relay the target data set.

In one subembodiment of the embodiment, the node B applies the target ID to receive the target data set.

In one subembodiment of the embodiment, the node B applies the target ID to forward the target data set.

In one subembodiment of the embodiment, the node forwards the target data set to the first node by unicast.

In one embodiment, the advantage of the above method is that a remote UE can receive control information through a serving cell, that is, node A, which is conducive to the unified coordination of the network and is more reliable. At the same time, node B only needs to relay the data that the remote UE is interested in or requires to receive, which is conducive to reducing redundancy, reducing waste and improving efficiency.

Embodiment 10

Figure 10:
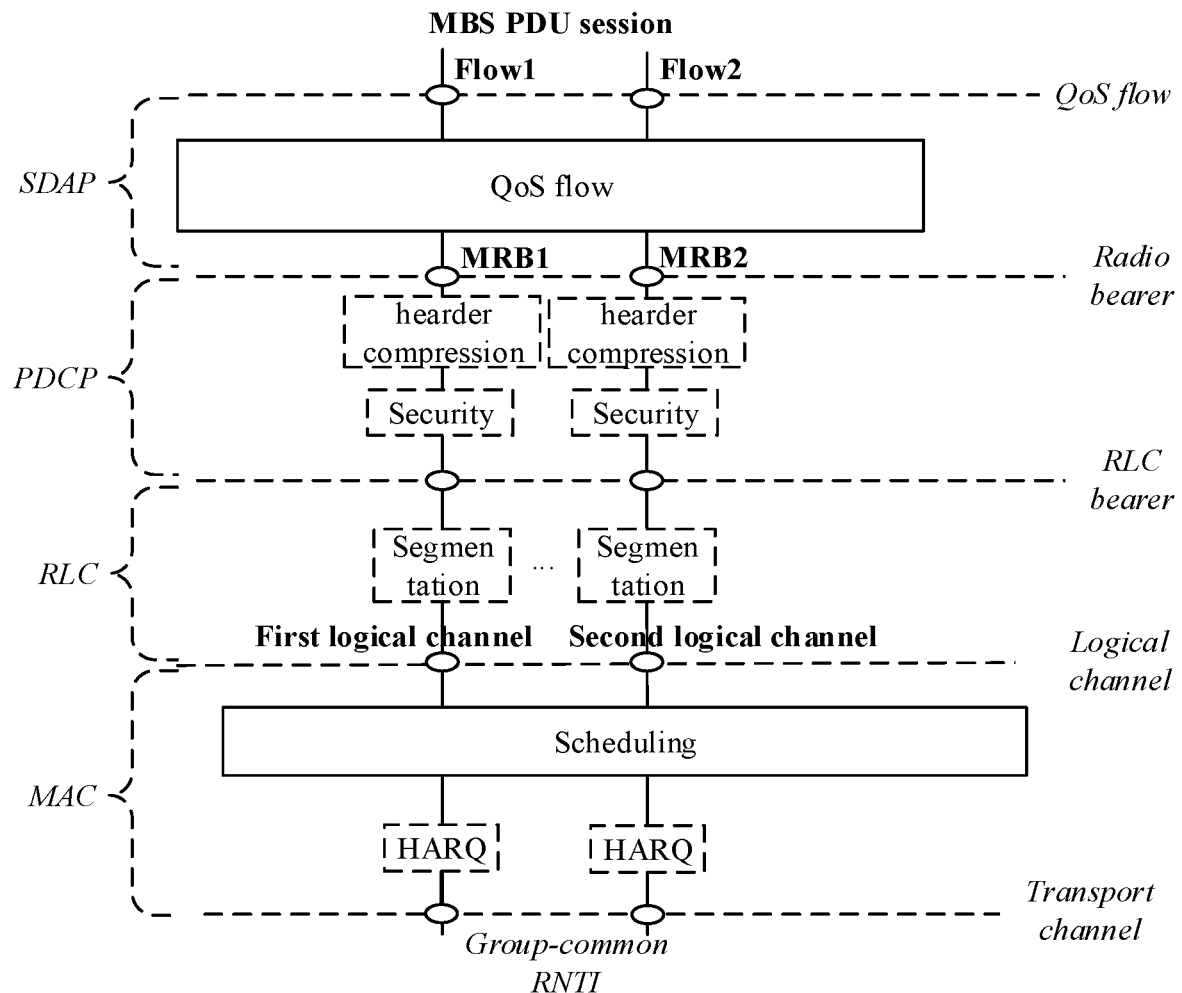
FIG. 10 illustrates a schematic diagram of a target ID according to one embodiment of the present disclosure.

Embodiment 10 illustrates a schematic diagram of a target ID according to one embodiment of the present disclosure, as shown in FIG. 10. In FIG. 10, the functions in the dotted box are optional.

In one embodiment, an MBS PDU session in FIG. 10 is an MBS PDU session of the first service, or, the first service belongs to the MBS PDU session; and the MBS PDU session is a PDU session indicating a groupcast service.

In one embodiment, the MBS PDU session comprises at least two flows, such as Flow1 and Flow2; the Flow1 and the Flow2 are both flows of the first service.

In one embodiment, the Flow1 and the Flow2 are respectively an IP flow or QoS flow or a flow of multicast service.

In one embodiment, the Flow1 and the Flow2 are respectively mapped to K radio bearers through a SDAP layer, in embodiment 10, K is equal to 2, and the method proposed in the present disclosure does not limit the specific value of K as long as K is an integer greater than 1; the K radio bearers are respectively MRB1 and MRB2, and the MRB1 and the MRB2 are respectively non-unicast bearers.

In one embodiment, the first service comprises K data sets, K is equal to 2, a first data set in the K data sets corresponds to the Flow1, and a second data set in the K data sets corresponds to the Flow2; a first data set in the K data sets is carried by the MRB1; and a second data set in the K data sets is carried by the MRB2.

In one embodiment, data carried by the MRB1 enters into the RLC layer through the processing of the PDCP layer, and is carried through a first logical channel, and an ID of the first logical channel is a first logical channel ID.

In one embodiment, data carried by the MRB2 enters into the RLC layer through the processing of the PDCP layer, and is carried through a second logical channel, and an ID of the second logical channel is a second logical channel ID.

In one embodiment, data of the first logical channel and data of the second logical channel are processed to be multiplexed in a first downlink physical channel through the MAC layer, the first downlink physical channel is a PDSCH, and a PDCCH scheduling the first downlink physical channel utilizes a group common RNTI for scrambling.

In one subembodiment of the embodiment, the target ID is the first logical channel ID, the target data set is the first data set in the K data sets, or, the target ID is the second logical channel ID, and the target data set is the second data set in the K data sets.

In one subembodiment of the embodiment, the first signaling indicates the one group common RNTI that a PDCCH scheduling the first downlink physical channel used for scrambling.

Embodiment 11

Figure 11:
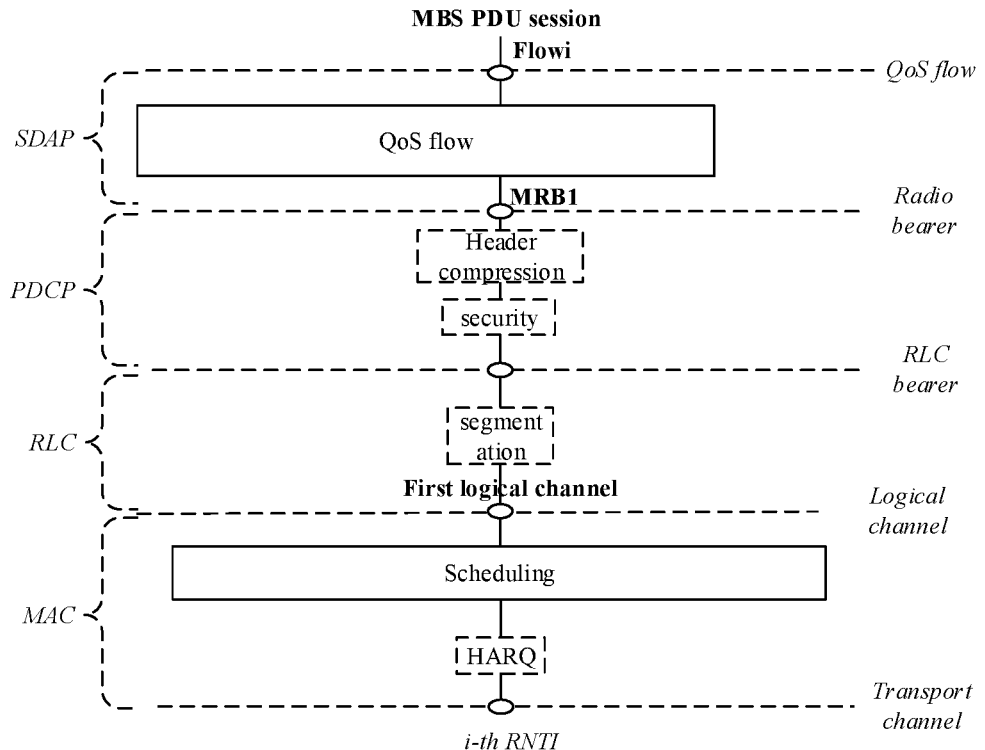
FIG. 11 illustrates a schematic diagram of a target ID according to one embodiment of the present disclosure.

Embodiment 11 illustrates a schematic diagram of a target ID according to one embodiment of the present disclosure, as shown in FIG. 11. In FIG. 11, the functions in the dotted box are optional. FIG. 11 illustrates a protocol structure on the first node side.

In one embodiment, an MBS PDU session in FIG. 11 is an MBS PDU session of the first service, or, the first service belongs to the MBS PDU session; and the MBS PDU session is a PDU session indicating a groupcast service.

In one embodiment, an area to which the first node belongs is area i, that is, the first node is located within the area i.

In one embodiment, the area i belongs to the first area set; data of the first service to which the area i corresponding is an i-th data set in the K data sets.

In one embodiment, the first signaling is used to indicate the area i.

In one embodiment, the i-th data set in the K data sets corresponds to Flowi of the first service, where the Flowi comprises IP flow or QoS flow or MBS flow or multicast flow.

In one embodiment, the first signaling is used to configure an MRB1 and a first logical channel, the MRB1 is a non-unicast bearer used to bear the target data set, and the target data set is the i-th data set in the K data sets.

In one embodiment, the target ID is an i-th RNTI, the i-th RNTI belongs to the first ID set, the first node applies the i-th RNTI to receive the target data set, and the i-th RNTI is a group common RNTI.

Embodiment 12

Figure 12:
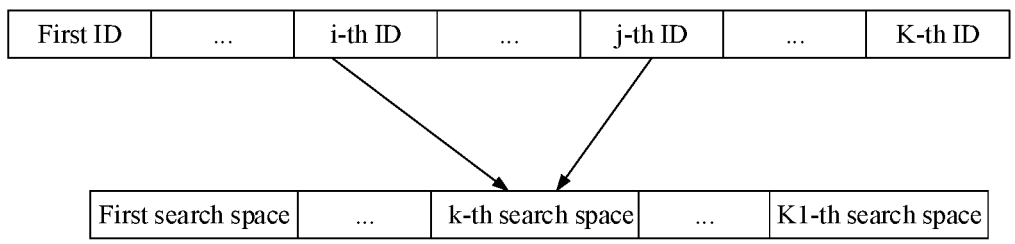
FIG. 12 illustrates a schematic diagram of a target ID and a search space according to one embodiment of the present disclosure.

Embodiment 12 illustrates a schematic diagram of a target ID and a search space according to one embodiment of the present disclosure, as shown in FIG. 12.

In one embodiment, the upper row of rectangles in FIG. 12 shows K IDs in the first ID set; and the lower row of rectangles in FIG. 12 shows the K1 search spaces.

In one embodiment, K1 is equal to 1.
In one embodiment, K1 is equal to 2.
In one embodiment, K1 is equal to K.
In one embodiment, K1 is a positive integer.

In one embodiment, the first node receives first information, the first information indicates the K1 search space(s).

In one embodiment, the first information indicates a mapping relation between the K1 search space(s) and an ID in the first ID set.

In one embodiment, the first signaling indicates a mapping relation between the K1 search space(s) and an ID in the first ID set.

In one embodiment, K1 is equal to K, and the K1 search space(s) respectively correspond to the K ID(s) in the first ID set; and one of the K1 search space(s) corresponding to the target ID is a target search space.

In one embodiment, K1 is less than K, there at least exist an i-th ID and a j-th ID in the first ID set being mapped to one of the K1 search space(s); and one of the K1 search space(s) corresponding to the target ID is a target search space.

In one embodiment, the first node blindly detects a fifth PDCCH channel within the target search space, the fifth PDCCH channel carries time-frequency resources occupied to indicate a fifth downlink physical channel, or the fifth PDCCH channel schedules the fifth downlink physical channel; and the fifth downlink physical channel carries the target data set.

Embodiment 13

Figure 13:
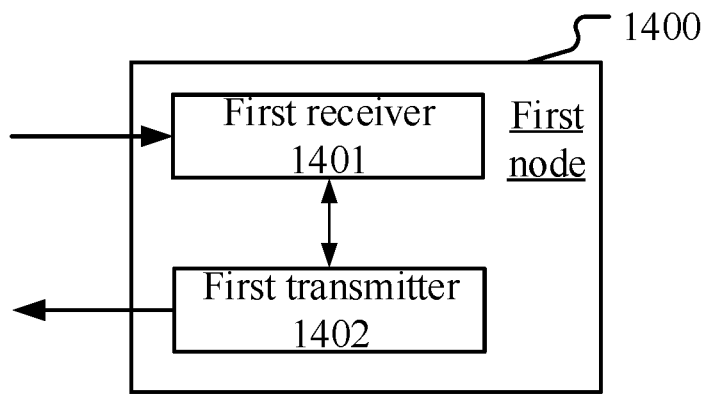
FIG. 13 illustrates a schematic diagram of a processing device in a first node according to one embodiment of the present disclosure.

Embodiment 13 illustrates a structure block diagram of a processing device in a first node according to one embodiment of the present disclosure, as shown in FIG. 13. In FIG. 13, a processing device 1400 in a first node comprises a first receiver 1401 and a first transmitter 1402. In Embodiment 13, the first receiver 1401 receives a first signaling, the first signaling is used to indicate a first ID set of a first service, the first service is a non-unicast service, and the first ID set comprises a plurality of IDs; determines a target ID; and applies the target ID to receive the target data set;

herein, the first service comprises K data sets, the target data set is one of the K data sets, K being a positive integer greater than 1; the first ID set comprises K IDs, and the target ID is one of the K IDs in the first ID set; the K data sets of the first service are respectively identified by the K IDs in the first ID set; any ID in the first ID set is one of a search space ID, a group common RNTI, a logical channel ID and a radio bearer ID; and a location of the first node is used to determine the target ID.

In one embodiment, the first transmitter 1402 transmits a first message, the first message is used to indicate at least one of location information of the first node or a first area ID; and location information of the first node is used to determine the first area ID;

the first receiver 1401 receives a second signaling, the second signaling indicates the target ID.

In one embodiment, the first signaling indicates a first area set, the first area set comprises K areas, and the K areas in the first area set are respectively associated with the K IDs in the first ID set; and the first area set and a location of the first node are used together to determine the target ID.

In one embodiment, each ID in the first ID set is a group common RNTI; the first signaling indicates a second ID set, and the second ID set comprises K IDs; the K IDs in the second ID set respectively correspond to the K IDs in the first ID set; any ID in the second ID set is one of a logical channel ID and a radio bearer ID; the K data sets of the first service are transmitted at the same time by respectively applying the K IDs in the first ID set and the K IDs in the second ID set.

In one embodiment, the first signaling indicates K flows of the first service, the K flows of the first service respectively correspond to the K data sets, and the K flows of the first service are mapped onto a same radio bearer.

In one embodiment, the first receiver 1401 receives first information, and the first information is used to indicate K1 search space(s); each ID in the first ID set is a group common RNTI; each of the K IDs in the first ID set is associated with one of the K1 search space(s), wherein K1 is a positive integer not greater than K.

In one embodiment, the first receiver 1402, before determining the target ID, applies a second target ID to receive a second target data set; in response to determining the target ID, the first receiver 1401 resets or releases an RLC entity used to receive the second target data set; the second target data set belongs to the first service; the second target ID belongs to the first ID set; and the second target ID is different from the target ID.

In one embodiment, the first node is a UE.

In one embodiment, the first node is a terminal that supports large delay differences.

In one embodiment, the first node is a terminal that supports NTN.

In one embodiment, the first node is an aircraft.

In one embodiment, the first node is a vehicle terminal.

In one embodiment, the first node is a relay.

In one embodiment, the first node is a vessel.

In one embodiment, the first node is a IoT terminal.

In one embodiment, the first node is a IIoT terminal.

In one embodiment, the first node is a device that supports transmission with low time delay and high-reliability.

In one embodiment, the first node is a node supporting multicast.

In one embodiment, the first receiver 1401 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1402 comprises at least one of the antenna 452, the transmitter 454, the transmitting processor 468, the multi-antenna transmitting processor 457, the controller/processor 459, the memory 460 or the data source 467 in Embodiment 4.

Embodiment 14

Figure 14:
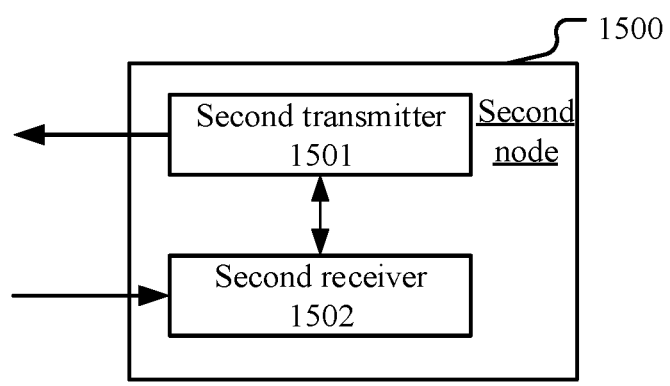
FIG. 14 illustrates a schematic diagram of a processing device in a second node according to one embodiment of the present disclosure.

Embodiment 14 illustrates a structure block diagram of a processing device in a second node according to one embodiment of the present disclosure, as shown in FIG. 14. In FIG. 14, a processing device 1500 of a second node comprises a second transmitter 1501 and a second receiver 1502. In Embodiment 14, a second transmitter 1501 transmits a first signaling, the first signaling is used to indicate a first ID set of a first service, the first service is a non-unicast service, and the first ID set comprises a plurality of IDs; a receiver of the first signaling determines a target ID and applies the target ID to receive the target data set;

herein, the first service comprises K data sets, the target data set is one of the K data sets, K being a positive integer greater than 1; the first ID set comprises K IDs, and the target ID is one of the K IDs in the first ID set; the K data sets of the first service are respectively identified by the K IDs in the first ID set; any ID in the first ID set is one of a search space ID, a group common RNTI, a logical channel ID and a radio bearer ID; and a location of the receiver of the first signaling is used to determine the target ID.

In one embodiment, the second receiver 1502 receives a first message, the first message is used to indicate at least one of location information of the first node or a first area ID; and location information of a transmitter of the first message is used to determine the first area ID;

the second transmitter 1502 transmits a second signaling, and the second signaling indicates the target ID.

In one embodiment, the first signaling indicates a first area set, the first area set comprises K areas, and the K areas in the first area set are respectively associated with the K IDs in the first ID set; the first area set and a location of a receiver of the first signaling are used together to determine the target ID.

In one embodiment, each ID in the first ID set is a group common RNTI; the first signaling indicates a second ID set, and the second ID set comprises K IDs; the K IDs in the second ID set respectively correspond to the K IDs in the first ID set; any ID in the second ID set is one of a logical channel ID and a radio bearer ID; the K data sets of the first service are transmitted at the same time by respectively applying the K IDs in the first ID set and the K IDs in the second ID set.

In one embodiment, the first signaling indicates K flows of the first service, the K flows of the first service respectively correspond to the K data sets, and the K flows of the first service are mapped onto a same radio bearer.

In one embodiment, the second transmitter 1501 transmits first information, and the first information is used to indicate K1 search space(s); each ID in the first ID set is a group common RNTI; each of the K IDs in the first ID set is associated with one of the K1 search space(s), wherein K1 is a positive integer not greater than K.

In one embodiment, a receiver of the first signaling, before determining the target ID, applies a second target ID to receive a second target data set; in response to determining the target ID, the receiver of the first signaling, resets or releases an RLC entity used to receive the second target data set; the second target data set belongs to the first service; the second target ID belongs to the first ID set; and the second target ID is different from the target ID.

In one embodiment, the second node is a satellite.

In one embodiment, the second node is a UE.

In one embodiment, the second node is an IoT node.

In one embodiment, the second node is a wearable node.

In one embodiment, the second node is a base station.

In one embodiment, the second node is a relay.

In one embodiment, the second node is an access point.

In one embodiment, the second node is a node supporting multicast.

In one embodiment, the second node is a satellite.

In one embodiment, the second transmitter 1501 comprises at least one of the antenna 420, the transmitter 418, the transmitting processor 416, the multi-antenna transmitting processor 471, the controller/processor 475 or the memory 476 in Embodiment 4.

In one embodiment, the second receiver 1502 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, satellite communication equipment, vessel communication equipment, NTN UEs, etc. The base station or system device in the present disclosure includes but is not limited to macro-cellular base stations, micro-cellular base stations, home base stations, relay base station, gNB (NR node B), Transmitter Receiver Points (TRP), NTN base stations, satellite equipment, flight platform equipment and other radio communication equipment, eNB (LIE node B), test devices, such as transceiver devices simulating some functions of base station, signaling testers and etc.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling, the first signaling being used to indicate a first identity (ID) set of a first service, the first service being a non-unicast service, and the first ID set comprising a plurality of IDs; determining a target ID; and applying the target ID to receive a target data set;
wherein the first service comprises K data sets, the target data set is one of the K data sets, K being a positive integer greater than 1; the first ID set comprises K IDs, and the target ID is one of the K IDs in the first ID set; the K data sets of the first service are respectively identified by the K IDs in the first ID set; any ID in the first ID set is one of a search space ID, a group common Radio Network Temporary Identity (RNTI), a logical channel ID and a radio bearer ID; and a location of the first node is used to determine the target ID; the first node is a User Equipment (UE);
wherein the location of the first node being used to determine the target ID includes the following meaning: the location of the first node comprises at least one coordinate value in a specific geographic coordinate system, and an ID in the first ID set comprises at least partial bits of the coordinate value of the first node; and the target ID is determined through the at least partial bits.

2. The first node according to claim 1, wherein the first signaling indicates a first area set, the first area set comprises K areas, and the K areas in the first area set are respectively associated with the K IDs in the first ID set; the first area set and a location of the first node are used together to determine the target ID.

3. The first node according to claim 2, wherein each ID in the first ID set is a group common RNTI; the first signaling indicates a second ID set, and the second ID set comprises K IDs; the K IDs in the second ID set respectively correspond to the K IDs in the first ID set; any ID in the second ID set is one of a logical channel ID and a radio bearer ID; the K data sets of the first service are transmitted at the same time by respectively applying the K IDs in the first ID set and the K IDs in the second ID set.

4. The first node according to claim 1, wherein the first signaling indicates K flows of the first service, the K flows of the first service respectively correspond to the K data sets, and the K flows of the first service are mapped onto a same radio bearer.

5. The first node according to claim 2, wherein the first signaling indicates K flows of the first service, the K flows of the first service respectively correspond to the K data sets, and the K flows of the first service are mapped onto a same radio bearer.

6. The first node according to claim 1, comprising:
the first receiver, receiving first information, and the first information being used to indicate K1 search space(s); each ID in the first ID set is a group common RNTI; each of the K IDs in the first ID set is associated with one of the K1 search space(s), wherein K1 is a positive integer not greater than K.

7. The first node according to claim 1, wherein the first signaling indicates a service ID of the first service, and the service ID of the first service is one of a Temporary Mobile Group Identity (TMGI) or a source IP address; the first signaling indicates a first session of the first service; and the K data sets of the first service belong to the first session.

8. The first node according to claim 1, wherein the first signaling is transmitted by broadcast.

9. The first node according to claim 1, wherein the first signaling is received from a node different from a transmitter of the K data sets.

10. The first node according to claim 9, wherein the first signaling is received from a Master Cell Group (MCG) of the first node; and a transmitter of the K data sets is a Secondary Cell Group (SCG) of the first node.

11. The first node according to claim 9, wherein the first signaling is received from a source cell of the first node; and a transmitter of the K data sets is a target cell of the first node.

12. The first node according to claim 9, wherein the first signaling is received from a serving cell of the first node; and a transmitter of the K data sets is a relay of the first node.

13. The first node according to claim 1, wherein the K data sets are respectively transmitted through K radio bearers, and IDs of the K radio bearers are respectively the K IDs in the first ID set; and the K radio bearers comprise a non-unicast bearer.

14. The first node according to claim 2, wherein the first signaling comprises IDs of the K areas in the first area set.

15. The first node according to claim 2, comprising:
the first receiver, receives a configuration message; the configuration message indicates a first Radio Network Temporary Identity (RNTI); the first RNTI is a Cell-Radio Network Temporary Identity (C-RNTI); the first RNTI is used to scramble a first physical channel transmitting the first service; the first RNTI is used to scramble a Physical Downlink Control Channel (PDCCH) channel scheduling the first physical channel; the first physical channel is a Physical Downlink Shared Channel (PDSCH) channel, and the first physical channel is used to bear the target data set; and the first physical channel is only used to bear the target data set in the K data sets.

16. The first node according to claim 1, wherein the first signaling comprises a Non-Access Stratum (NAS) signaling.

17. The first node according to claim 1, comprising:

the first receiver, before the behavior of determining that the target ID is executed, applying a second target ID to receive a second target set; in response to determining the target ID, resetting or releasing an RLC entity used to receive the second target data set; the second target data set belonging to the first service; the second target ID belonging to the first ID set; and the second target ID being different from the target ID.

18. A second node for wireless communications, comprising:

a second transmitter, transmitting a first signaling, the first signaling being used to indicate a first ID set of a first service, the first service being a non-unicast service, and the first ID set comprising a plurality of IDs;

wherein the first service comprises K data sets, a target data set is one of the K data sets, K being a positive integer greater than 1; the first ID set comprises K IDs, and the target ID is one of the K IDs in the first ID set; the K data sets of the first service are respectively identified by the K IDs in the first ID set; any ID in the first ID set is one of a search space ID, a group common RNTI, a logical channel ID and a radio bearer ID; and a location of the receiver of the first signaling is used to determine the target ID; the second node is a Base Station (BS);

wherein the location of the first node being used to determine the target ID includes the following meaning: the location of the first node comprises at least one coordinate value in a specific geographic coordinate system, and an ID in the first ID set comprises at least partial bits of the coordinate value of the first node; and the target ID is determined through the at least partial bits.

19. A method in a first node for wireless communication, comprising:

receiving a first signaling, the first signaling being used to indicate a first ID set of a first service, the first service being a non-unicast service, and the first ID set comprising a plurality of IDs; determining a target ID; and applying the target ID to receive a target data set;

wherein the first service comprises K data sets, the target data set is one of the K data sets, K being a positive integer greater than 1; the first ID set comprises K IDs, and the target ID is one of the K IDs in the first ID set; the K data sets of the first service are respectively identified by the K IDs in the first ID set; any ID in the first ID set is one of a search space ID, a group common RNTI, a logical channel ID and a radio bearer ID; and a location of the first node is used to determine the target ID; the first node is a User Equipment (UE);

wherein the location of the first node being used to determine the target ID includes the following meaning: the location of the first node comprises at least one coordinate value in a specific geographic coordinate system, and an ID in the first ID set comprises at least partial bits of the coordinate value of the first node; and the target ID is determined through the at least partial bits.

* * * * *